(12) United States Patent
Shimizu et al.

(10) Patent No.: US 12,032,053 B2
(45) Date of Patent: Jul. 9, 2024

(54) ANGLE MEASURING DEVICE, ANGLE MEASURING METHOD, AND IN-VEHICLE DEVICE

(71) Applicant: Mitsubishi Electric Corporation, Tokyo (JP)

(72) Inventors: Yu Shimizu, Tokyo (JP); Satoshi Kageme, Tokyo (JP); Kei Suwa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 505 days.

(21) Appl. No.: 17/360,201

(22) Filed: Jun. 28, 2021

(65) Prior Publication Data

US 2021/0325524 A1 Oct. 21, 2021

Related U.S. Application Data

(63) Continuation of application No. PCT/JP2019/003423, filed on Jan. 31, 2019.

(51) Int. Cl.
*G01S 13/44* (2006.01)
*G01S 7/41* (2006.01)

(52) U.S. Cl.
CPC .............. *G01S 13/44* (2013.01); *G01S 7/41* (2013.01)

(58) Field of Classification Search
CPC .................................. G01S 13/44; G01S 7/41
(Continued)

(56) References Cited

U.S. PATENT DOCUMENTS 6,456,238 B1 * 9/2002 Posey ................. G01S 13/4463
342/149
7,242,343 B1 * 7/2007 Woodell .................... G01S 7/41
342/26 B
(Continued)

FOREIGN PATENT DOCUMENTS

CN 104380136 A * 2/2015 ........... G01S 13/003
EP 1684092 A1 * 7/2006 ........... G01S 13/449
(Continued)

OTHER PUBLICATIONS

Chinese Office Action and Search Report for Chinese Application No. 201980089978.0, dated Nov. 29, 2023, with English translation.
(Continued)

*Primary Examiner* — Nuzhat Pervin
(74) *Attorney, Agent, or Firm* — Birch, Stewart, Kolasch & Birch, LLP

(57) ABSTRACT

An angle measuring device includes: a signal extracting unit for extracting a signal that includes a first reflection wave and does not include a second reflection wave as a first demodulated signal and a signal that includes the second reflection wave and does not include the first reflection wave as a second demodulated signal from reception signals output from one or more reception antennas among a plurality of reception antennas; an elevation calculating unit for calculating an elevation of a target by performing monopulse angle measurement using a sum signal of the first demodulated signal and the second demodulated signal and a difference signal between the first demodulated signal and the second demodulated signal; and an azimuth calculating unit for calculating an azimuth of the target using reception signals output from the plurality of reception antennas.

12 Claims, 17 Drawing Sheets

(58) Field of Classification Search
USPC .......................................................... 342/146
See application file for complete search history.

(56) References Cited

U.S. PATENT DOCUMENTS

| | | | | |
|---|---|---|---|---|
| 7,612,706 B2* | 11/2009 | Honda | ................... | H01Q 25/02 |
| | | | | 342/107 |
| 9,121,930 B2 | 9/2015 | Ding et al. | | |
| 9,279,884 B2* | 3/2016 | Chung | ................... | G01S 13/44 |
| 9,541,638 B2* | 1/2017 | Jansen | ................. | G01S 13/878 |
| 9,618,616 B2* | 4/2017 | Kishigami | ................ | G01S 7/40 |
| 9,810,774 B2* | 11/2017 | Wittenberg | .......... | G01S 13/4463 |
| 10,317,518 B2* | 6/2019 | Warnick | ............... | H01Q 13/085 |
| 10,473,775 B2* | 11/2019 | Slemp | ...................... | H01Q 3/04 |
| 10,615,516 B2* | 4/2020 | Kishigami | ............. | G01S 13/284 |
| 10,641,882 B2* | 5/2020 | Kishigami | .............. | G01S 7/023 |
| 11,579,283 B2* | 2/2023 | Giere | .................. | G01S 13/4445 |
| 2003/0085833 A1* | 5/2003 | Yu | ........................ | G01S 13/4463 |
| | | | | 342/380 |
| 2005/0057393 A1* | 3/2005 | Henftling | ................ | G01S 13/44 |
| | | | | 342/107 |
| 2005/0110673 A1* | 5/2005 | Izumi | ................... | H01Q 25/002 |
| | | | | 342/107 |
| 2007/0182622 A1* | 8/2007 | Weatherford | ........... | G01S 13/44 |
| | | | | 342/149 |
| 2008/0007455 A1* | 1/2008 | Shirakawa | ............. | H01Q 21/06 |
| | | | | 342/437 |
| 2009/0153395 A1* | 6/2009 | Morinaga | ................. | G01S 5/04 |
| | | | | 342/175 |
| 2011/0109495 A1* | 5/2011 | Takeya | .................... | G01S 13/34 |
| | | | | 342/107 |
| 2015/0061921 A1* | 3/2015 | Ding | .................... | H01Q 21/065 |
| | | | | 342/149 |
| 2022/0043133 A1* | 2/2022 | Iwasa | .................... | H01Q 21/293 |
| 2023/0401866 A1* | 12/2023 | Mori | ..................... | G01S 13/887 |

FOREIGN PATENT DOCUMENTS

| | | | | | |
|---|---|---|---|---|---|
| EP | | 2071357 A1 | * | 6/2009 | ......... G01S 13/4454 |
| JP | | 7-234276 A | | 9/1995 | |
| JP | | 2005331466 A | * | 12/2005 | ............. G01S 13/46 |
| JP | | 5163765 B2 | * | 3/2013 | ............. G01S 13/42 |
| JP | | 2016-102801 A | | 6/2016 | |
| JP | | 6052928 B2 | | 12/2016 | |
| JP | | 6567832 B2 | * | 8/2019 | ........... G01S 13/426 |

OTHER PUBLICATIONS

German Office Action for German Application No. 11 2019 006 521.1, dated Mar. 29, 2022, with English translation.

* cited by examiner

ANGLE MEASURING DEVICE, ANGLE MEASURING METHOD, AND IN-VEHICLE DEVICE

CROSS REFERENCE TO RELATED APPLICATION

This application is a Continuation of PCT International Application No. PCT/JP2019/003423, filed on Jan. 31, 2019, which is hereby expressly incorporated by reference into the present application.

TECHNICAL FIELD

The present invention relates to an angle measuring device, an angle measuring method, and an in-vehicle device for calculating each of the elevation of a target and the azimuth of the target.

BACKGROUND ART

Patent Literature 1 below discloses a radar for calculating an elevation angle of a target object.

The radar disclosed in Patent Literature 1 includes two transmission antennas and one reception antenna.

Of the two transmission antennas, one transmission antenna transmits a first signal in a first direction, and the other transmission antenna transmits a second signal in a second direction that is different from the first direction. The first direction is tilted by an angle θ with respect to the boresight axis of the radar, and the second direction is tilted by angle −θ with respect to the boresight axis of the radar.

The reception antenna receives each of the first signal reflected by the target object and the second signal reflected by the target object.

The radar disclosed in Patent Literature 1 calculates the elevation angle of the target object from the phase difference between the first signal received by the reception antenna and the second signal received by the reception antenna.

CITATION LIST

Patent Literature

Patent Literature 1: JP 2016-102801 A

SUMMARY OF INVENTION

Technical Problem

Since the radar disclosed in Patent Literature 1 has one reception antenna, it is difficult to broaden the antenna aperture in the azimuth direction. Therefore, the radar disclosed in Patent Literature 1 has a problem that it is difficult to calculate the azimuth angle of a target object with high resolution although the elevation angle of the target object can be calculated.

The present invention has been made to solve the above-mentioned problem, and it is an object of the present invention to obtain an angle measuring device, an angle measuring method, and an in-vehicle device capable of calculating the azimuth of a target with higher resolution than in a case where one reception antenna is used while calculating the elevation of the target.

Solution to Problem

An angle measuring device according to the present invention includes: processing circuitry performing a process of: extracting a signal that includes a first reflection wave and does not include a second reflection wave as a first demodulated signal and a signal that includes the second reflection wave and does not include the first reflection wave as a second demodulated signal from reception signals output from one or more reception antennas among a plurality of reception antennas when a first beam is radiated from a first transmission antenna, a second beam, an elevation angle in a radiation direction of which is different from an elevation angle in a radiation direction of the first beam, is radiated from a second transmission antenna, an installation position of which in an azimuth direction is different from an installation position in the azimuth direction of the first transmission antenna, and then each of the plurality of reception antennas arranged between the first transmission antenna and the second transmission antenna outputs a reception signal including the first reflection wave, which is the first beam reflected by a target, and the second reflection wave, which is the second beam reflected by the target; calculating an elevation of the target by performing monopulse angle measurement using a sum signal of the first demodulated signal and the second demodulated signal and a difference signal between the first demodulated signal and the second demodulated signal; and calculating an azimuth of the target using reception signals output from the plurality of reception antennas.

Advantageous Effects of Invention

According to the present invention, an angle measuring device includes: an elevation calculating unit for calculating the elevation of a target by performing monopulse angle measurement using a sum signal of a first demodulated signal and a second demodulated signal and a difference signal between the first demodulated signal and the second demodulated signal; and an azimuth calculating unit for calculating the azimuth of the target using reception signals output from a plurality of reception antennas. Therefore, the angle measuring device according to the present invention can calculate the azimuth of a target with higher resolution, than in a case of using one reception antenna, while calculating the elevation of the target.

BRIEF DESCRIPTION OF DRAWINGS

FIG. 6 is a hardware configuration diagram of a computer in a case where the components of the signal processor 4 and an azimuth calculating unit 5 are implemented by software, firmware, or the like.

DESCRIPTION OF EMBODIMENTS

In order to describe the present invention further in detail, embodiments for carrying out the invention will be described below with reference to the accompanying drawings.

First Embodiment

Figure 1:
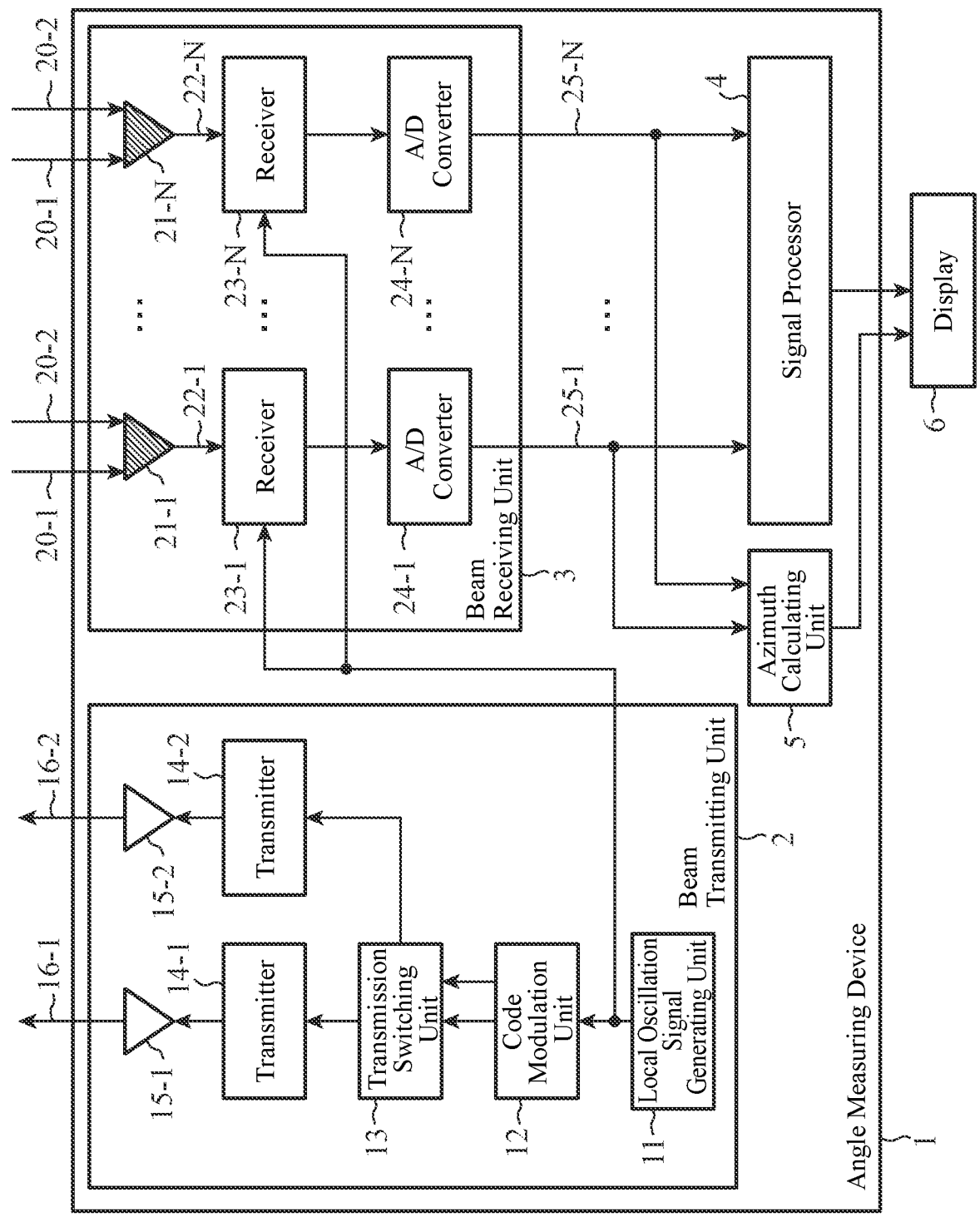
FIG. 1 is a configuration diagram illustrating an angle measuring device 1 according to a first embodiment.

FIG. 1 is a configuration diagram illustrating an angle measuring device 1 according to a first embodiment.

Figure 2:
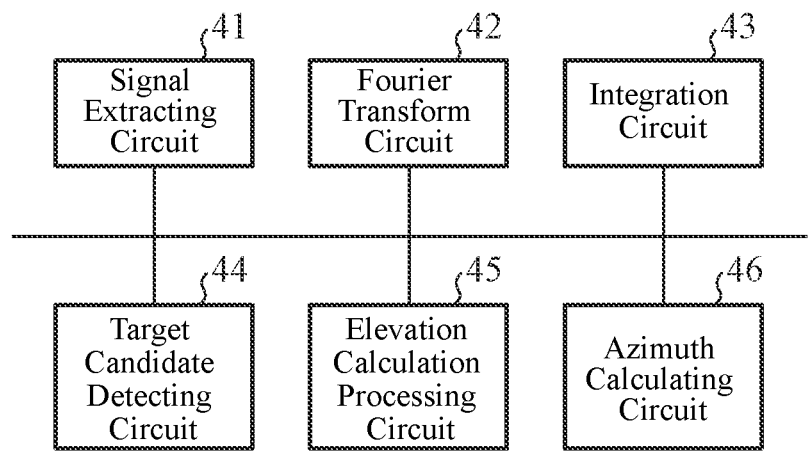
FIG. 2 is a hardware configuration diagram illustrating the hardware of a signal processor 4 and an azimuth calculating unit 5 in the angle measuring device 1 according to the first embodiment.

FIG. 2 is a hardware configuration diagram illustrating the hardware of a signal processor 4 and an azimuth calculating unit 5 in the angle measuring device 1 according to the first embodiment.

In FIG. 1, the angle measuring device 1 includes a beam transmitting unit 2, a beam receiving unit 3, a signal processor 4, and an azimuth calculating unit 5.

The beam transmitting unit 2 includes a local oscillation signal generating unit 11, a code modulation unit 12, a transmission switching unit 13, transmitters 14-1 and 14-2, a first transmission antenna 15-1, and a second transmission antenna 15-2.

The beam transmitting unit 2 radiates a first beam 16-1 from the first transmission antenna 15-1 and a second beam 16-2 from the second transmission antenna 15-2.

Each of the first beam 16-1 and the second beam 16-2 is a radio frequency (RF) signal.

The local oscillation signal generating unit 11 generates a local oscillation signal and outputs the signal to the code modulation unit 12 and each of the receivers 23-1 to 23-N.

The code modulation unit 12 includes, for example, an internal memory that stores a first code $C_1$ and a second code $C_2$.

The code modulation unit 12 assigns the first code $C_1$ to the local oscillation signal output from the local oscillation signal generating unit 11 and outputs the local oscillation signal assigned with the first code $C_1$ (hereinafter referred to as "first local oscillation signal") to the transmission switching unit 13.

The code modulation unit 12 also assigns the second code $C_2$ that is different from the first code $C_1$ to the local oscillation signal output from the local oscillation signal generating unit 11 and outputs the local oscillation signal assigned with the second code $C_2$ (hereinafter referred to as "second local oscillation signal") to the transmission switching unit 13.

As the first code $C_1$ and the second code $C_2$, for example, a Barker code, an M sequence (Maximum length sequence) can be used.

Here, the code modulation unit 12 includes an internal memory that stores the first code $C_1$ and the second code $C_2$. However, this is merely an example, and the code modulation unit 12 may receive each of the first code $C_1$ and the second code $C_2$ from the outside of the device.

The transmission switching unit 13 outputs the first local oscillation signal output from the code modulation unit 12 to the transmitter 14-1 and outputs the second local oscillation signal output from the code modulation unit 12 to the transmitter 14-2.

Then, the transmission switching unit 13 outputs first angle information indicating each of the elevation angle and the azimuth angle in the radiation direction of a first beam 16-1 to the transmitter 14-1. The transmission switching unit 13 outputs second angle information indicating each of the elevation angle and the azimuth angle in the radiation direction of a second beam 16-2 to the transmitter 14-2.

The elevation angle in the radiation direction of the first beam 16-1 and the elevation angle in the radiation direction of the second beam 16-2 are different.

The azimuth angle in the radiation direction of the first beam 16-1 and the azimuth angle in the radiation direction of the second beam 16-2 are almost the same.

Each of the first angle information and the second angle information may be stored in the internal memory of the transmission switching unit 13 or may be provided from the outside of the device.

The frequency of the first beam 16-1 and the frequency of the second beam 16-2 are substantially the same.

The transmitter 14-1 acquires the first local oscillation signal from the transmission switching unit 13 and acquires the first angle information from the transmission switching unit 13.

The transmitter 14-1 radiates the first beam 16-1 from the first transmission antenna 15-1 by giving the acquired first local oscillation signal to the first transmission antenna 15-1.

The transmitter 14-1 controls the first transmission antenna 15-1 so that the elevation angle in the radiation direction of the first beam 16-1 radiated from the first transmission antenna 15-1 matches the elevation angle indicated by the first angle information that has been acquired.

The transmitter 14-1 also controls the first transmission antenna 15-1 so that the azimuth angle in the radiation direction of the first beam 16-1 radiated from the first transmission antenna 15-1 matches the azimuth angle indicated by the first angle information that has been acquired.

The transmitter 14-2 acquires the second local oscillation signal from the transmission switching unit 13 and acquires the second angle information from the transmission switching unit 13.

The transmitter 14-2 radiates the second beam 16-2 from the second transmission antenna 15-2 by giving the second local oscillation signal that has been acquired to the second transmission antenna 15-2.

The transmitter 14-2 controls the second transmission antenna 15-2 so that the elevation angle in the radiation direction of the second beam 16-2 radiated from the second transmission antenna 15-2 matches the elevation angle indicated by the second angle information that has been acquired.

The transmitter 14-2 also controls the second transmission antenna 15-2 so that the azimuth angle in the radiation direction of the second beam 16-2 radiated from the second transmission antenna 15-2 matches the azimuth angle indicated by the second angle information that has been acquired.

Figure 3:
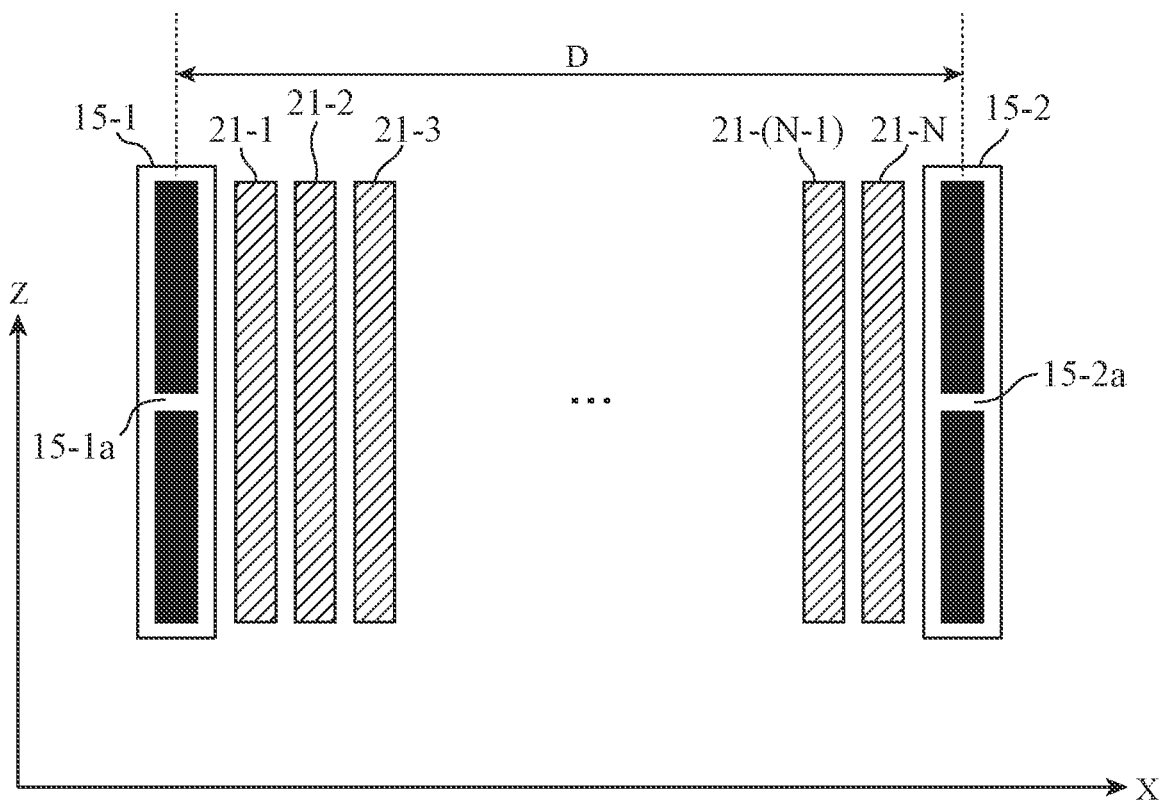
FIG. 3 is an explanatory diagram illustrating an arrangement example of a first transmission antenna 15-1, a second transmission antenna 15-2, and reception antennas 21-1 to 21-N.

As illustrated in FIG. 3, the first transmission antenna 15-1 has one antenna aperture 15-1a and radiates the first beam 16-1 into space from the one antenna aperture 15-1a.

As illustrated in FIG. 3, the second transmission antenna 15-2 has one antenna aperture 15-2a and radiates the second beam 16-2 into space from the one antenna aperture 15-2a.

The installation position of the first transmission antenna 15-1 in the azimuth direction and the installation position of the second transmission antenna 15-2 in the azimuth direction are different as illustrated in FIG. 3.

FIG. 3 is an explanatory diagram illustrating an arrangement example of the first transmission antenna 15-1, the second transmission antenna 15-2, and the reception antennas 21-1 to 21-N.

In the example of FIG. 3, the arrangement interval between the first transmission antenna 15-1 and the second transmission antenna 15-2 is D.

In the example of FIG. 3, the aperture length of the first transmission antenna 15-1 and the aperture length of the second transmission antenna 15-2 are equivalent. However, this is merely an example, and the aperture length of the first transmission antenna 15-1 and the aperture length of the second transmission antenna 15-2 may be different.

Figure 4:
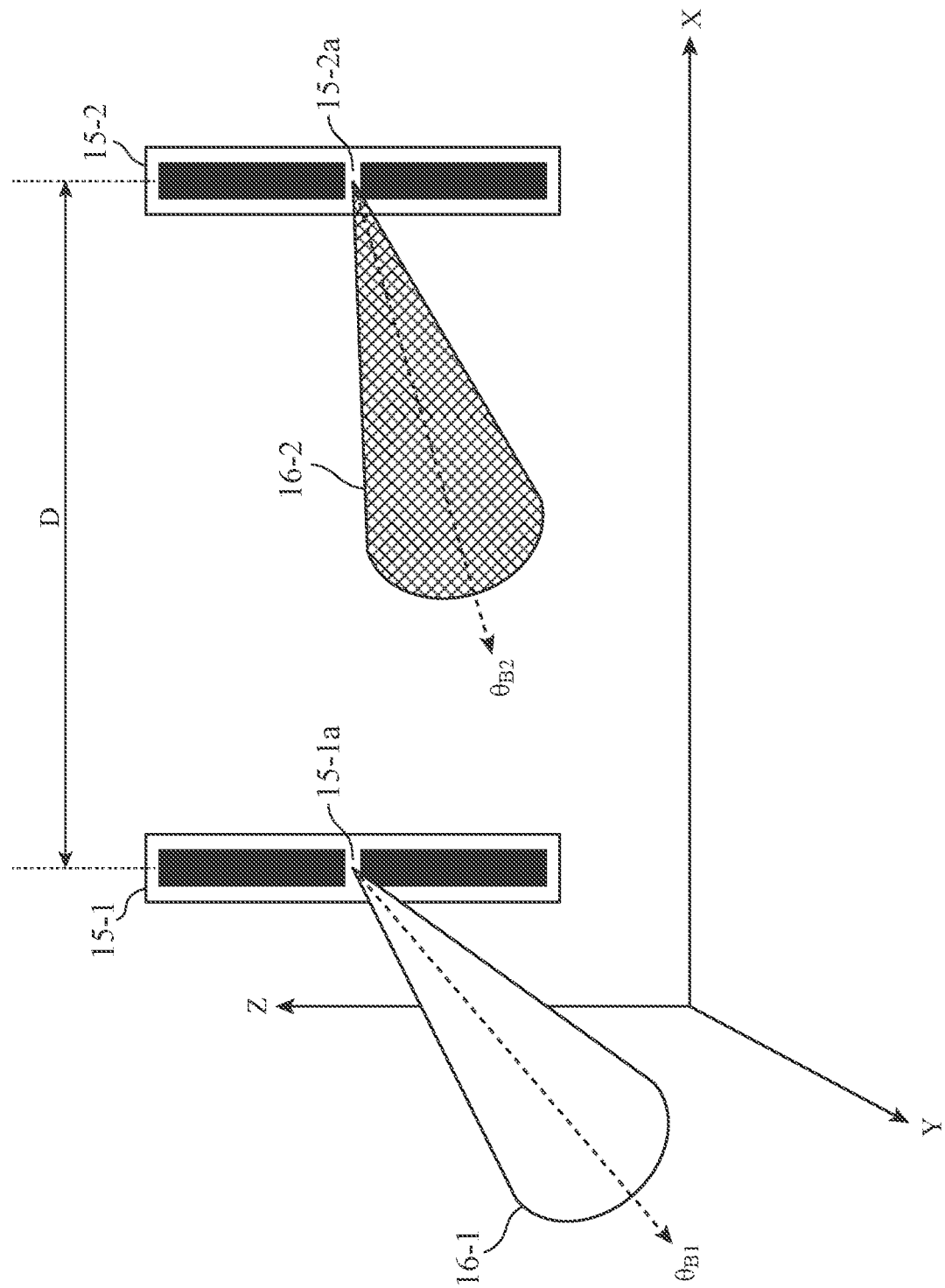
FIG. 4 is an explanatory diagram illustrating elevation angle $\theta_{B1}$ in the radiation direction of a first beam 16-1 and elevation angle $\theta_{B2}$ in the radiation direction of a second beam 16-2.

The elevation angle in the radiation direction of the first beam 16-1 is $\theta_{B1}$ as illustrated in FIG. 4, and the elevation angle in the radiation direction of the second beam 16-2 is $\theta_{B2}$ as illustrated in FIG. 4, and $\theta_{B1} \neq \theta_{B2}$.

FIG. 4 is an explanatory diagram illustrating elevation angle $\theta_{B1}$ in the radiation direction of the first beam 16-1 and elevation angle $\theta_{B2}$ in the radiation direction of the second beam 16-2.

In FIGS. 3 and 4, X-axis represents the azimuth direction. In FIGS. 3 and 4, the azimuth direction coincides with the horizontal direction for the sake of simplicity. However, this is merely an example, and the azimuth direction is not required to coincide with the horizontal direction.

Axis Z represents the elevation direction. In FIGS. 3 and 4, the elevation direction coincides with the vertical direction for the sake of simplicity. However, this is merely an example, and the elevation direction is not required to coincide with the vertical direction.

Axis Y is orthogonal to X-axis and is orthogonal to Z-axis.

The beam receiving unit 3 includes the reception antennas 21-1 to 21-N, the receivers 23-1 to 23-N, and analog-to-digital converters (hereinafter referred to as "A/D converters") 24-1 to 24-N.

The reception antennas 21-1 to 21-N are arranged between the first transmission antenna 15-1 and the second transmission antenna 15-2. N is an integer greater than or equal to 2.

In the example of FIG. 3, N reception antennas 21-n (n=1, ..., N) are arrayed in a row in the horizontal direction.

A reception antenna 21-n receives a first reflection wave 20-1, which is the first beam 16-1 reflected by a target, and a second reflection wave 20-2, which is the second beam 16-2 reflected by the target.

The reception antenna 21-n outputs a reception signal 22-n including the first reflection wave 20-1 and the second reflection wave 20-2 to a receiver 23-n.

In the example of FIG. 3, the aperture lengths of the reception antennas 21-1 to 21-N are equal to each other. However, this is merely an example, and the aperture lengths of the reception antennas 21-1 to 21-N may be different from each other.

For each of the first transmission antenna 15-1, the second transmission antenna 15-2, and the reception antennas 21-1 to 21-N, for example, a patch antenna, or a horn antenna can be used.

The receiver 23-n reduces the frequency of the reception signal 22-n output from the reception antenna 21-n, for example, from an RF frequency to an intermediate frequency (IF) using the local oscillation signal output from the local oscillation signal generating unit 11.

The receiver 23-n outputs the reception signal 22-n after the frequency reduction to an analog-to-digital converter (hereinafter referred to as "A/D converter") 24-n.

The A/D converter 24-n converts the reception signal 22-n after the frequency reduction that has been output from the receiver 23-n from an analog signal to a digital signal 25-n and outputs the digital signal 25-n to each of the signal processor 4 and the azimuth calculating unit 5.

Figure 5:
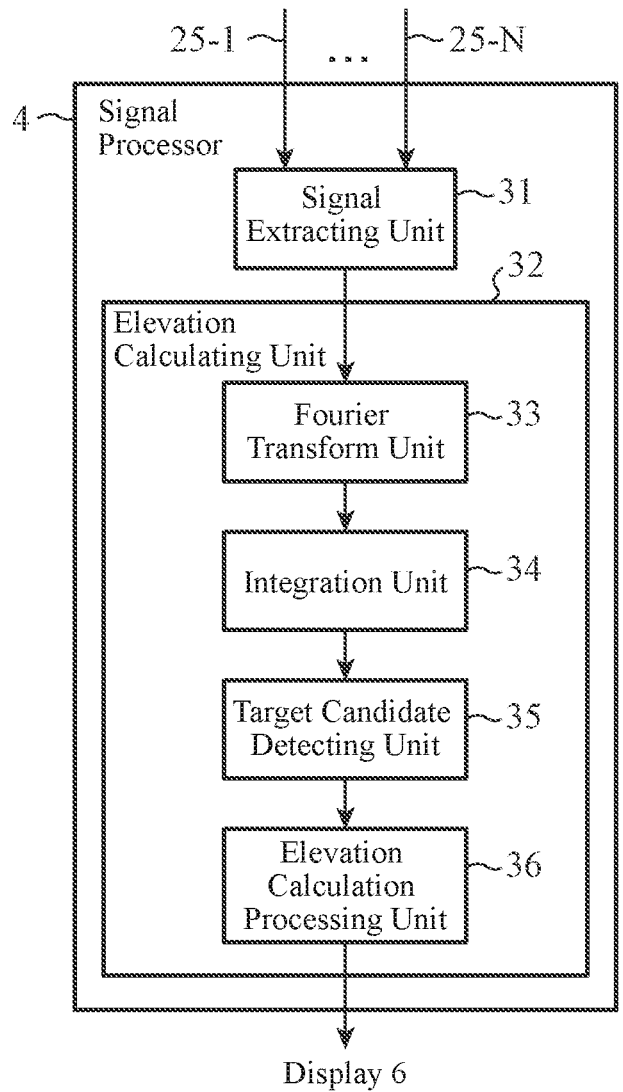
FIG. 5 is a configuration diagram illustrating a signal processor 4 in the angle measuring device 1 according to the first embodiment.

As illustrated in FIG. 5, the signal processor 4 includes a signal extracting unit 31 and an elevation calculating unit 32.

FIG. 5 is a configuration diagram illustrating the signal processor 4 in the angle measuring device 1 according to the first embodiment.

In FIG. 5, the signal extracting unit 31 is implemented by, for example, a signal extracting circuit 41 illustrated in FIG. 2.

The signal extracting unit 31 includes, for example, an internal memory that stores the first code $C_1$ and the second code $C_2$.

The signal extracting unit 31 extracts a first demodulated signal $S_1$ using the first code $C_1$ from each of one or more digital signals 25-n among the digital signals 25-1 to 25-N output from the A/D converters 24-1 to 24-N.

The signal extracting unit 31 extracts a second demodulated signal $S_2$ using the second code $C_2$ from each of the one or more digital signals 25-n.

The signal extracting unit 31 outputs one or more first demodulated signals $S_1$ and one or more second demodulated signals $S_2$ to the elevation calculating unit 32.

The first demodulated signal $S_1$ includes the first reflection wave 20-1 and does not include the second reflection wave 20-2, and the second demodulated signal $S_2$ includes the second reflection wave 20-2 and does not include the first reflection wave 20-1.

Here, the signal extracting unit 31 includes an internal memory that stores the first code $C_1$ and the second code $C_2$. However, this is merely an example, and the signal extracting unit 31 may receive each of the first code $C_1$ and the second code $C_2$ from the outside of the device.

The elevation calculating unit 32 includes a Fourier transform unit 33, an integration unit 34, a target candidate detecting unit 35, and an elevation calculation processing unit 36.

The elevation calculating unit 32 calculates elevation $\theta_{tgt}$ of the target by performing monopulse angle measurement using a sum signal of the first demodulated signal $S_1$ and the second demodulated signal $S_2$ and a difference signal between the first demodulated signal $S_1$ and the second demodulated signal $S_2$.

The elevation calculating unit 32 outputs elevation $\theta_{tgt}$ of the target that has been calculated to a display 6.

The Fourier transform unit 33 is implemented by, for example, a Fourier transform circuit 42 illustrated in FIG. 2.

The Fourier transform unit 33 performs a fast Fourier transform (FFT) on each of the first demodulated signals $S_1$ output from the signal extracting unit 31 and thereby converts each of the first demodulated signals $S_1$ into a signal $FS_1$ in the frequency domain.

The Fourier transform unit 33 also performs a FFT on each of the second demodulated signals $S_2$ output from the signal extracting unit 31 and thereby converts each of the second demodulated signals $S_2$ into a signal $FS_2$ in the frequency domain.

The Fourier transform unit 33 outputs one or more signals $FS_1$ in the frequency domain and one or more signals $FS_2$ in the frequency domain to the integration unit 34.

Here, the Fourier transform unit 33 performs an FFT on each of the first demodulated signals $S_1$ and an FFT on each of the second demodulated signals $S_2$. However, this is merely an example, and the Fourier transform unit 33 may perform a digital Fourier transform (DFT) on each of the first demodulated signals $S_1$ and a DFT on each of the second demodulated signals $S_2$.

The integration unit 34 is implemented by, for example, an integration circuit 43 illustrated in FIG. 2.

Having received the plurality of signals $FS_1$ in the frequency domain from the Fourier transform unit 33, the integration unit 34 incoherently integrates the plurality of signals $FS_1$ in the frequency domain.

Likewise, having received the plurality of signals $FS_2$ in the frequency domain from the Fourier transform unit 33, the integration unit 34 incoherently integrates the plurality of signals $FS_2$ in the frequency domain.

The integration unit 34 outputs a first integration signal $IC_1$ to the target candidate detecting unit 35 as the incoherent integration result of the signals $FS_1$ in the frequency domain and outputs a second integration signal $IC_2$ to the target candidate detecting unit 35 as the incoherent integration result of the signals $FS_2$ in the frequency domain.

If the number of signals $FS_1$ in the frequency domain output from the Fourier transform unit 33 is one, the integration unit 34 outputs the signals $FS_1$ in the frequency domain as the first integration signal $IC_1$ to the target candidate detecting unit 35.

Likewise, if the number of signals $FS_2$ in the frequency domain output from the Fourier transform unit 33 is one, the integration unit 34 outputs the signals $FS_2$ in the frequency domain as the second integration signal $IC_2$ to the target candidate detecting unit 35.

The target candidate detecting unit 35 is implemented by, for example, a target candidate detecting circuit 44 illustrated in FIG. 2.

The target candidate detecting unit 35 calculates a first target signal $M_1(\theta_{tgt})$ indicating the amplitude of the target candidate by performing, for example, constant false alarm ratio (CFAR) processing using the first integration signal $IC_1$ output from the integration unit 34.

Likewise, the target candidate detecting unit 35 calculates a second target signal $M_2(\theta_{tgt})$ indicating the amplitude of the target candidate by performing, for example, CFAR processing using the second integration signal $IC_2$ output from the integration unit 34.

The target candidate detecting unit 35 outputs each of the first target signal $M_1(\theta_{tgt})$ and the second target signal $M_2(\theta_{tgt})$ to the elevation calculation processing unit 36.

The elevation calculation processing unit 36 is implemented by, for example, an elevation calculation processing circuit 45 illustrated in FIG. 2.

The elevation calculation processing unit 36 calculates a sum signal $\Sigma(\theta_{tgt})$ of the first target signal $M_1(\theta_{tgt})$ and the second target signal $M_2(\theta_{tgt})$ output from the target candidate detecting unit 35.

The elevation calculation processing unit 36 also calculates a difference signal $\Delta(\theta_{tgt})$ between the first target signal $M_1(\theta_{tgt})$ and the second target signal $M_2(\theta_{tgt})$ output from the target candidate detecting unit 35.

The elevation calculation processing unit 36 calculates elevation $\theta_{tgt}$ of the target by performing amplitude-comparison monopulse angle measurement using the sum signal $\Sigma(\theta_{tgt})$ and the difference signal $\Delta(\theta_{tgt})$.

The elevation calculation processing unit 36 outputs elevation $\theta_{tgt}$ of the target that has been calculated to the display 6.

The azimuth calculating unit 5 is implemented by, for example, an azimuth calculating circuit 46 illustrated in FIG. 2.

The azimuth calculating unit 5 calculates azimuth $\varphi_{tgt}$ of the target by performing digital beam forming (DBF) processing using the digital signals 25-1 to 25-N output from the A/D converters 24-1 to 24-N.

The azimuth calculating unit 5 outputs azimuth $\varphi_{tgt}$ of the target that has been calculated to the display 6.

Here, the azimuth calculating unit 5 calculates azimuth $\varphi_{tgt}$ of the target by performing DBF processing. However, this is merely an example, and the azimuth calculating unit 5 may calculate azimuth $\varphi_{tgt}$ of the target by performing multi input multi output (MIMO) processing using the digital signals 25-1 to 25-N output from the A/D converters 24-1 to 24-N.

The display 6 displays, for example, elevation $\theta_{tgt}$ of the target calculated by the elevation calculating unit 32 and azimuth $\varphi_{tgt}$ of the target calculated by the azimuth calculating unit 5.

In FIGS. 1 and 5, it is assumed that each of the signal extracting unit 31, the Fourier transform unit 33, the integration unit 34, the target candidate detecting unit 35, and the elevation calculation processing unit 36, which are components of the signal processor 4, and the azimuth calculating unit 5 is implemented by dedicated hardware as illustrated in FIG. 2. That is, it is assumed that the components of the signal processor 4 and the azimuth calculating unit 5 are implemented by the signal extracting circuit 41, the Fourier transform circuit 42, the integration circuit 43, the target candidate detecting circuit 44, the elevation calculation processing circuit 45, and the azimuth calculating circuit 46.

Here, each of the signal extracting circuit 41, the Fourier transform circuit 42, the integration circuit 43, the target candidate detecting circuit 44, the elevation calculation processing circuit 45, and the azimuth calculating circuit 46 corresponds to a single circuit, a composite circuit, a programmed processor, a parallel-programmed processor, an application specific integrated circuit (ASIC), a field-programmable gate array (FPGA), or a combination thereof.

The components of the signal processor 4 and the azimuth calculating unit 5 are not limited to implementation by dedicated hardware, and the components of the signal processor 4 and the azimuth calculating unit 5 may be implemented by software, firmware, or a combination of software and firmware.

The software or the firmware is stored in a memory of a computer as a program. Here, a computer refers to hardware for executing the program and corresponds to, for example, a central processing unit (CPU), a central processing device, a processing device, an arithmetic device, a microprocessor, a microcomputer, a processor, or a digital signal processor (DSP).

Figure 6:
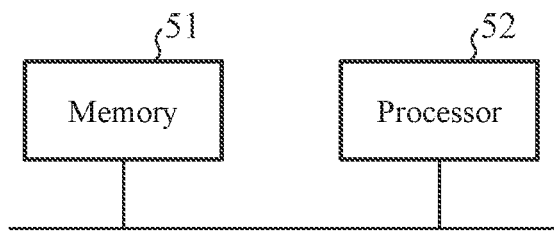

FIG. 6 is a hardware configuration diagram of a computer in a case where the components of the signal processor 4 and the azimuth calculating unit 5 are implemented by software, firmware, or the like.

In a case where the components of the signal processor 4 and the azimuth calculating unit 5 are implemented by software, firmware, or the like, programs for causing the computer to execute processing procedures performed in the signal extracting unit 31, the Fourier transform unit 33, the integration unit 34, the target candidate detecting unit 35, the elevation calculation processing unit 36, and the azimuth calculating unit 5 are stored in a memory 51. Then, a processor 52 of the computer executes the programs stored in the memory 51.

Figure 7:
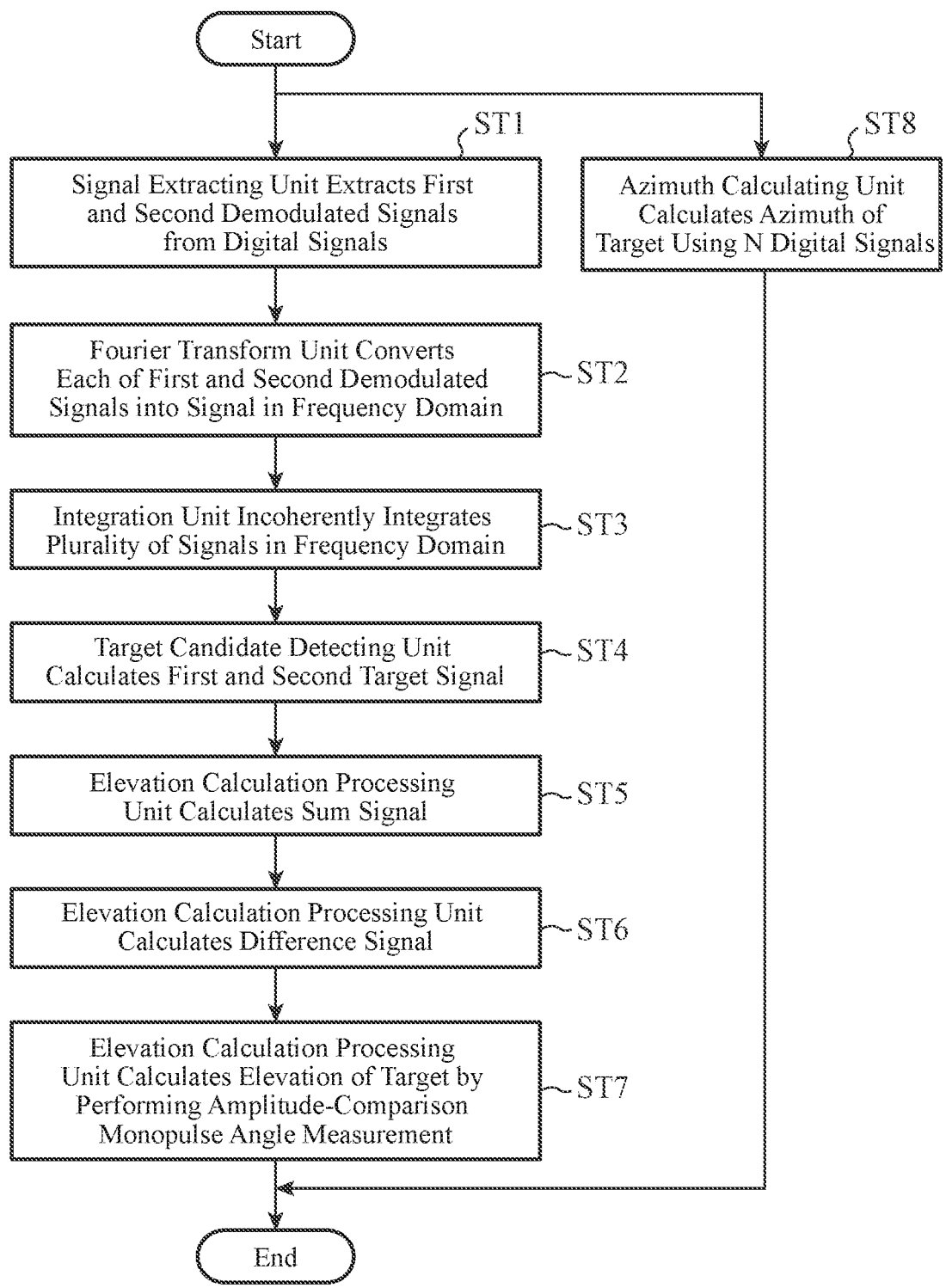
FIG. 7 is a flowchart illustrating an angle measuring method which is a processing procedure performed in the signal processor 4 and the azimuth calculating unit 5.

FIG. 7 is a flowchart illustrating an angle measuring method which is a processing procedure performed in the signal processor 4 and the azimuth calculating unit 5.

Meanwhile, in FIG. 2, an example is illustrated in which each of the components of the signal processor 4 and the azimuth calculating unit 5 is implemented by dedicated hardware, and in FIG. 6, an example is illustrated in which the signal processor 4 and the azimuth calculating unit 5 are implemented by software, firmware, or the like. However, this is merely an example, and some components in the signal processor 4 or the azimuth calculating unit 5 may be implemented by dedicated hardware, and the other components may be implemented by software, firmware, or the like.

Next, the operation of the angle measuring device 1 illustrated in FIG. 1 will be described.

The beam transmitting unit 2 radiates the first beam 16-1, which is an RF signal, from the first transmission antenna 15-1 toward the target and radiates the second beam 16-2, which is an RF signal, from the second transmission antenna 15-2 toward the target.

Hereinafter, the operation of the beam transmitting unit 2 will be specifically described.

First, the local oscillation signal generating unit 11 generates, for example, a high-frequency local oscillation signal and outputs the local oscillation signal that has been generated to the code modulation unit 12 and the receivers 23-1 to 23-N.

Having received a local oscillation signal from the local oscillation signal generating unit 11, the code modulation unit 12 assigns the first code $C_1$ to the local oscillation signal and outputs the first local oscillation signal, which is the local oscillation signal assigned with the first code $C_1$, to the transmission switching unit 13.

The code modulation unit 12 also assigns the second code $C_2$ that is different from the first code $C_1$ to the local oscillation signal output from the local oscillation signal generating unit 11 and outputs the second local oscillation signal, which is the local oscillation signal assigned with the second code $C_2$, to the transmission switching unit 13.

Having received the first local oscillation signal from the code modulation unit 12, the transmission switching unit 13 outputs the first local oscillation signal to the transmitter 14-1.

Then, the transmission switching unit 13 outputs first angle information indicating each of elevation angle $\theta_{B1}$ and the azimuth angle in the radiation direction of the first beam 16-1 to the transmitter 14-1.

Having received the second local oscillation signal from the code modulation unit 12, the transmission switching unit 13 outputs the second local oscillation signal to the transmitter 14-2.

Then, the transmission switching unit 13 outputs second angle information indicating each of elevation angle $\theta_{B2}$ and the azimuth angle in the radiation direction of the second beam 16-2 to the transmitter 14-2.

The transmitter 14-1 acquires the first local oscillation signal from the transmission switching unit 13 and acquires the first angle information from the transmission switching unit 13.

The transmitter 14-1 radiates the first beam 16-1 from the first transmission antenna 15-1 by giving the acquired first local oscillation signal to the first transmission antenna 15-1.

The transmitter 14-1 controls the first transmission antenna 15-1 so that the elevation angle in the radiation direction of the first beam 16-1 radiated from the first transmission antenna 15-1 matches elevation angle $\theta_{B1}$ indicated by the first angle information that has been acquired.

The transmitter 14-1 also controls the first transmission antenna 15-1 so that the azimuth angle in the radiation direction of the first beam 16-1 radiated from the first transmission antenna 15-1 matches the azimuth angle indicated by the first angle information that has been acquired.

The transmitter 14-2 acquires the second local oscillation signal from the transmission switching unit 13 and acquires the second angle information from the transmission switching unit 13.

The transmitter 14-2 radiates the second beam 16-2 from the second transmission antenna 15-2 by giving the second local oscillation signal that has been acquired to the second transmission antenna 15-2.

The transmitter 14-2 controls the second transmission antenna 15-2 so that the elevation angle in the radiation direction of the second beam 16-2 radiated from the second transmission antenna 15-2 matches elevation angle $\theta_{B2}$ indicated by the second angle information that has been acquired.

The transmitter 14-2 also controls the second transmission antenna 15-2 so that the azimuth angle in the radiation direction of the second beam 16-2 radiated from the second transmission antenna 15-2 matches the azimuth angle indicated by the second angle information that has been acquired.

The elevation angle $\theta_{B1}$ in the radiation direction of the first beam 16-1 and the elevation angle $\theta_{B2}$ in the radiation direction of the second beam 16-2 are different as illustrated in FIG. 4.

Both elevation angle $\theta_{B1}$ illustrated in FIG. 4 and elevation angle $\theta_{B2}$ illustrated in FIG. 4 are tilted in the negative elevation direction. However, this is merely an example, and as illustrated in FIG. 8, elevation angle $\theta_{B1}$ may be tilted in the negative elevation direction when elevation angle $\theta_{B2}$ is tilted in the positive elevation direction.

Figure 8:
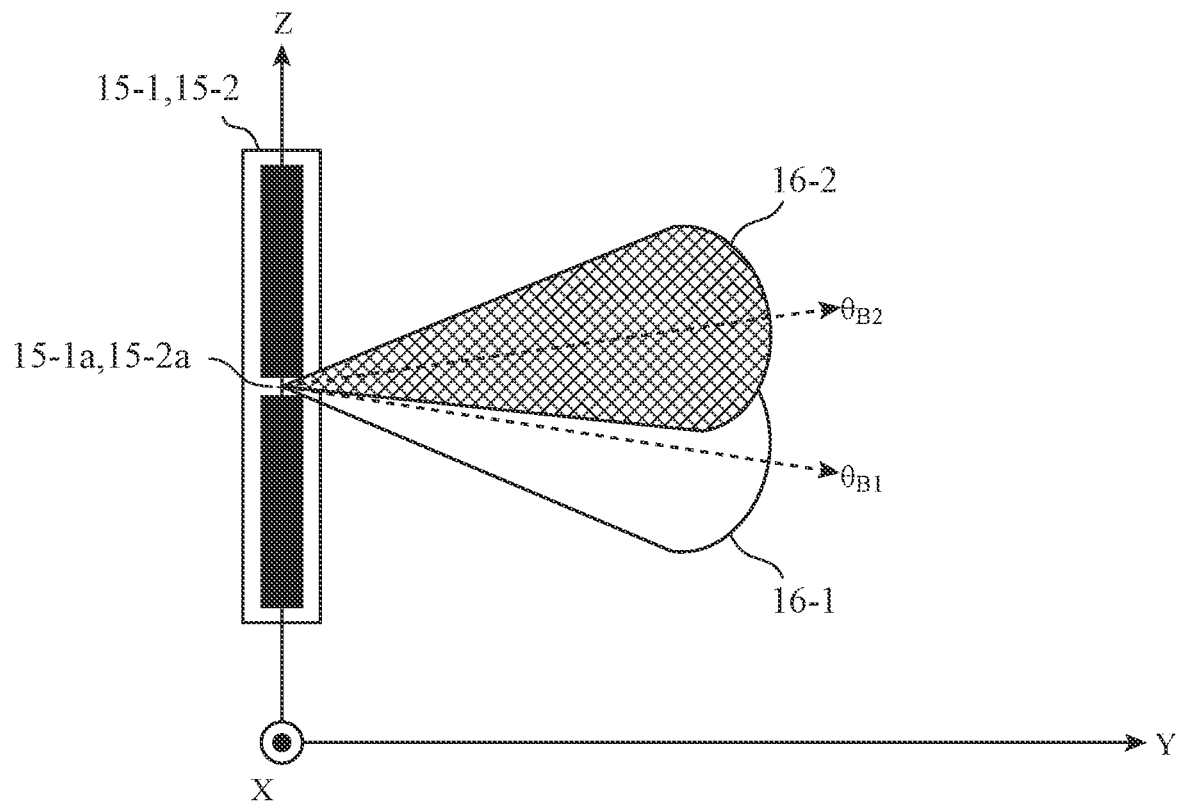
FIG. 8 is an explanatory diagram illustrating an example of elevation angle $\theta_{B1}$ in the radiation direction of the first beam 16-1 and elevation angle $\theta_{B2}$ in the radiation direction of the second beam 16-2.

FIG. 8 is an explanatory diagram illustrating an example of elevation angle $\theta_{B1}$ in the radiation direction of the first beam 16-1 and elevation angle $\theta_{B2}$ in the radiation direction of the second beam 16-2. In FIG. 8, it is illustrated that the first transmission antenna 15-1 and the second transmission antenna 15-2 are installed at the same position in order to facilitate understanding of the difference between elevation angle $\theta_{B1}$ and elevation angle $\theta_{B2}$.

The azimuth angle in the radiation direction of the first beam 16-1 and the azimuth angle in the radiation direction of the second beam 16-2 are almost the same.

The first transmission antenna 15-1 radiates the first beam 16-1 into space.

The second transmission antenna 15-2 radiates the second beam 16-2 into space.

In the angle measuring device 1 illustrated in FIG. 1, it is assumed that the first beam 16-1 and the second beam 16-2 are radiated simultaneously from the first transmission antenna 15-1 and the second transmission antenna 15-2, respectively.

The first beam 16-1 radiated from the first transmission antenna 15-1 is reflected by the target, and the first beam 16-1 reflected by the target is received by each of the reception antennas 21-1 to 21-N as the first reflection wave 20-1.

The second beam 16-2 radiated from the second transmission antenna 15-2 is reflected by the target, and the second beam 16-2 reflected by the target is received by each of the reception antennas 21-1 to 21-N as the second reflection wave 20-2.

Having received each of the first reflection wave 20-1 and the second reflection wave 20-2, a reception antenna 21-$n$ (n=1, ..., N) outputs a reception signal 22-$n$ including the first reflection wave 20-1 and the second reflection wave 20-2 to a receiver 23-$n$.

The receiver 23-$n$ reduces the frequency of the reception signal 22-$n$ output from the reception antenna 21-$n$, for example, from an RF to an IF using the local oscillation signal output from the local oscillation signal generating unit 11.

The receiver 23-$n$ outputs the reception signal 22-$n$ after the frequency reduction to an A/D converter 24-$n$.

Having received the reception signal 22-$n$ after the frequency reduction from the receiver 23-$n$, the A/D converter 24-$n$ converts the reception signal 22-$n$ after the frequency reduction from an analog signal to a digital signal 25-$n$ and outputs the digital signal 25-$n$ to each of the signal processor 4 and the azimuth calculating unit 5.

The signal extracting unit 31 extracts a first demodulated signal $S_1$ using the first code $C_1$ from each of one or more digital signals 25-$n$ among the digital signals 25-1 to 25-N output from the A/D converters 24-1 to 24-N (step ST1 in FIG. 7).

The signal extracting unit 31 is only required to extract the first demodulated signal $S_1$ from each of the one or more of digital signals 25-$n$. Therefore, the signal extracting unit 31 may extract the first demodulated signal $S_1$ from any one digital signal 25-$n$ or may extract the first demodulated signal $S_1$ from each of any two digital signals 25-$n$. Alternatively, the signal extracting unit 31 may extract the first demodulated signal $S_1$ from each of the N digital signals 25-1 to 25-N.

The signal extracting unit 31 extracts the second demodulated signal $S_2$ using the second code $C_2$ from each of one or more digital signals 25-$n$ among the digital signals 25-1 to 25-N output from the A/D converters 24-1 to 24-N (step ST1 in FIG. 7).

The signal extracting unit 31 is only required to extract the second demodulated signal $S_2$ from each of the one or more of digital signals 25-$n$. Therefore, the signal extracting unit 31 may extract the second demodulated signal $S_2$ from any one digital signal 25-$n$ or may extract the second demodulated signal $S_2$ from each of any two digital signals 25-$n$. Alternatively, the signal extracting unit 31 may extract the second demodulated signal $S_2$ from each of the N digital signals 25-1 to 25-N.

Note that since the process itself of extracting the first demodulated signal $S_1$ from a digital signal 25-$n$ using the first code $C_1$ and the process itself of extracting the second demodulated signal $S_2$ from a digital signal 25-$n$ using the second code $C_2$ are known technology, detailed description thereof will be omitted.

The signal extracting unit 31 outputs one or more first demodulated signal $S_1$ that have been extracted to the Fourier transform unit 33 and outputs the one or more second demodulated signals $S_2$ that have been extracted to the Fourier transform unit 33.

Having received the one or more first demodulated signals $S_1$ from the signal extracting unit 31, the Fourier transform unit 33 performs an FFT on each of the first demodulated signals $S_1$ and thereby converts each of the first demodulated signals $S_1$ to a signal $FS_1$ in the frequency domain (step ST2 in FIG. 7).

Having received one or more second demodulated signals $S_2$ from the signal extracting unit 31, the Fourier transform unit 33 performs an FFT on each of the second demodulated signals $S_2$ and thereby converts each of the second demodulated signals $S_2$ to a signal $FS_2$ in the frequency domain (step ST2 in FIG. 7).

The Fourier transform unit 33 outputs one or more signals $FS_1$ in the frequency domain and one or more signals $FS_2$ in the frequency domain to the integration unit 34.

Having received the plurality of signals $FS_1$ in the frequency domain from the Fourier transform unit 33, the integration unit 34 incoherently integrates the plurality of signals $FS_1$ in the frequency domain (step ST3 in FIG. 7).

Having received the plurality of signals $FS_2$ in the frequency domain from the Fourier transform unit 33, the integration unit 34 incoherently integrates the plurality of signals $FS_2$ in the frequency domain (step ST3 in FIG. 7).

The integration unit 34 outputs a first integration signal $IC_1$ to the target candidate detecting unit 35 as the incoherent integration result of the signals $FS_1$ in the frequency domain and outputs a second integration signal $IC_2$ to the target candidate detecting unit 35 as the incoherent integration result of the signals $FS_2$ in the frequency domain.

If the number of signals $FS_1$ in the frequency domain output from the Fourier transform unit 33 is one, the integration unit 34 outputs the signals $FS_1$ in the frequency domain as the first integration signal $IC_1$ to the target candidate detecting unit 35.

Likewise, if the number of signals $FS_2$ in the frequency domain output from the Fourier transform unit 33 is one, the integration unit 34 outputs the signals $FS_2$ in the frequency domain as the second integration signal $IC_2$ to the target candidate detecting unit 35.

Having received the first integration signal $IC_1$ from the integration unit 34, the target candidate detecting unit 35 calculates the first target signal $M_1(\theta_{tgt})$ indicating the amplitude of the target candidate, for example, by performing CFAR processing using the first integration signal $IC_1$ (step ST4 in FIG. 7).

Having received the second integration signal $IC_2$ from the integration unit 34, the target candidate detecting unit 35 calculates the second target signal $M_2(\theta_{tgt})$ indicating the amplitude of the target candidate, for example, by performing CFAR processing using the second integration signal $IC_2$ (step ST4 in FIG. 7). Since the CFAR processing itself is known technology, detailed description thereof will be omitted.

The target candidate detecting unit 35 outputs each of the first target signal $M_1(\theta_{tgt})$ and the second target signal $M_2(\theta_{tgt})$ to the elevation calculation processing unit 36.

Having received the first target signal $M_1(\theta_{tgt})$ and the second target signal $M_2(\theta_{tgt})$ from the target candidate detecting unit 35, the elevation calculation processing unit 36 calculates the sum signal $\Sigma(\theta_{tgt})$ of the first target signal $M_1(\theta_{tgt})$ and the second target signal $M_2(\theta_{tgt})$ as expressed in Equation 1 below (step ST5 in FIG. 7).

$$\Sigma(\theta_{tgt}) = M_1(\theta_{tgt}) + M_2(\theta_{tgt}) \quad (1)$$

The elevation calculation processing unit 36 also calculates the difference signal $\Delta(\theta_{tgt})$ between the first target signal $M_1(\theta_{tgt})$ and the second target signal $M_2(\theta_{tgt})$ as expressed in Equation 2 below (step ST6 in FIG. 7).

$$\Delta(\theta_{tgt}) = M_1(\theta_{tgt}) - M_2(\theta_{tgt}) \quad (2)$$

Figure 9:
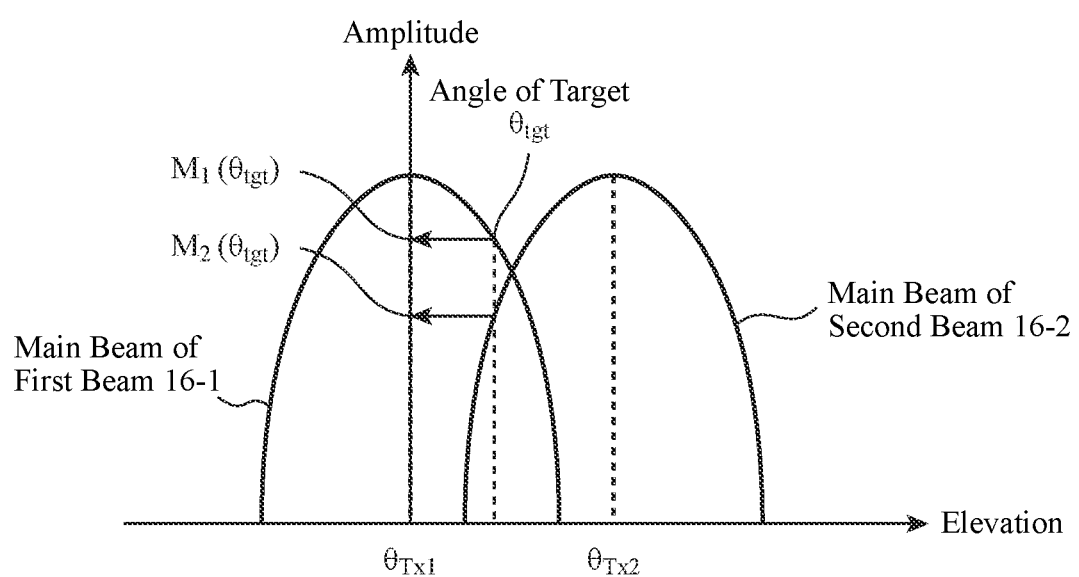
FIG. 9 is an explanatory diagram illustrating amplitude-comparison monopulse angle measurement by an elevation calculation processing unit 36.

As illustrated in FIG. 9, the elevation calculation processing unit 36 calculates elevation $\theta_{tgt}$ of the target by performing amplitude-comparison monopulse angle measurement using the sum signal $\Sigma(\theta_{tgt})$ and the difference signal $\Delta(\theta_{tgt})$ (step ST7 in FIG. 7).

FIG. 9 is an explanatory diagram illustrating amplitude-comparison monopulse angle measurement by the elevation calculation processing unit 36. In FIG. 9, $\theta_{TX1}$ is the center angle of the elevation of the main beam of the first beam 16-1, and $\theta_{TX2}$ is the center angle of the elevation of the main beam of the second beam 16-2.

The amplitude-comparison monopulse angle measurement is an approach for measuring an angle by radiating beams from two antennas in different directions and using the sum of the reflection waves of the respective beams reflected by a target and the difference between the reflection waves of the respective beams.

Hereinafter, the amplitude-comparison monopulse angle measurement by the elevation calculation processing unit 36 will be specifically described.

After calculating the sum signal $\Sigma(\theta_{tgt})$ and the difference signal $\Delta(\theta_{tgt})$, the elevation calculation processing unit 36 calculates ratio c of the difference signal $\Delta(\theta_{tgt})$ with respect to the sum signal $\Sigma(\theta_{tgt})$ as expressed in Equation 3 below.

$$\varepsilon = \frac{\Delta(\theta_{tgt})}{\Sigma(\theta_{tgt})} \quad (3)$$

An internal memory of the elevation calculation processing unit 36 stores a discrimination pattern (see FIG. 10) indicating ratio c' that corresponds to elevation $\theta'$. In the angle measuring device 1 illustrated in FIG. 1, the internal memory of the elevation calculation processing unit 36 stores the discrimination pattern. However, this is merely an example, and a memory external to the elevation calculation processing unit 36 may store the discrimination pattern.

The ratio $\varepsilon'$ is expressed by Equation 4 below.

$$\varepsilon' = \frac{\Delta(\theta')}{\Sigma(\theta')} = \frac{M_1(\theta') - M_2(\theta')}{M_1(\theta') + M_2(\theta')} \quad (4)$$

Figure 10:
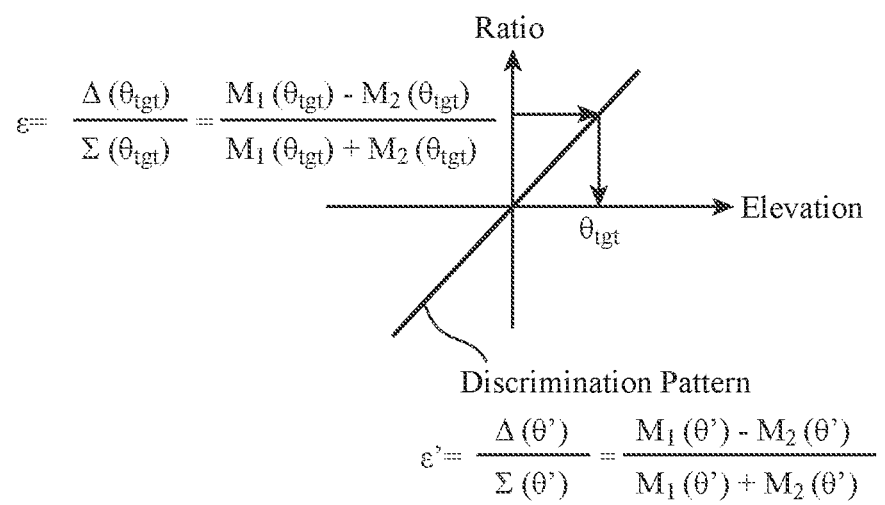
FIG. 10 is an explanatory diagram illustrating a calculation process of elevation $\theta_{tgt}$ using a discrimination pattern.

FIG. 10 is an explanatory diagram illustrating a calculation process of elevation $\theta_{tgt}$ using a discrimination pattern.

The discrimination pattern is a linear line or a curve indicating ratio $\varepsilon'$ that corresponds to elevation $\theta'$. The elevation calculation processing unit 36 can calculate the discrimination pattern from ratios $\varepsilon'$ that correspond to a plurality of elevations $\theta'$ by calculating respective ratios $\varepsilon'$ that correspond to the plurality of elevations $\theta'$ that are different from each other. Since the process itself of calculating the discrimination pattern is known technology, detailed description thereof will be omitted.

The elevation calculation processing unit 36 back-calculates elevation $\theta_{tgt}$ that corresponds to ratio $\varepsilon$ by applying the ratio $\varepsilon$ that has been calculated to ratio $\varepsilon'$ indicated by the discrimination pattern as illustrated in FIG. 10. Since the back calculation process of elevation $\theta_{tgt}$ itself is known technology, detailed description thereof will be omitted.

The elevation calculation processing unit 36 outputs the back-calculated elevation $\theta_{tgt}$ of the target to the display 6.

In the angle measuring device 1 illustrated in FIG. 1, the elevation calculation processing unit 36 calculates elevation $\theta_{tgt}$ of the target using the discrimination pattern. However, this is merely an example, and the elevation calculation processing unit 36 may refer to a table indicating the correspondence relationship between a plurality of elevations $\theta'$ different from each other and ratio $\varepsilon'$ of a difference signal $\Delta(\theta')$ with respect to a sum signal $\Sigma(\theta')$ and obtain elevation $\theta_{tgt}$ that corresponds to ratio $\varepsilon$ that has been calculated as described below.

Having calculated ratio $\varepsilon$ of the difference signal $\Delta(\theta_{tgt})$ with respect to the sum signal $\Sigma(\theta_{tgt})$, the elevation calculation processing unit 36 searches for ratio $\varepsilon'$ that matches the ratio $\varepsilon$ that has been calculated from ratios $\varepsilon'$ included in the table.

The elevation calculation processing unit 36 outputs elevation $\theta'$ that corresponds to the ratio $\varepsilon'$, obtained by the search, to the display 6 as the calculation result of the elevation $\theta_{tgt}$ of the target.

In a case where the table includes no ratio $\varepsilon'$ that matches the ratio $\varepsilon$ that has been calculated, the elevation calculation processing unit 36 searches for the largest ratio $\varepsilon'$ (hereinafter referred to as "ratio $\varepsilon'_1$") among ratios $\varepsilon'$ that are smaller than the ratio $\varepsilon$ that has been calculated among the ratios $\varepsilon'$ included in the table.

The elevation calculation processing unit 36 also searches for the smallest ratio $\varepsilon'$ (hereinafter referred to as "ratio $\varepsilon'_2$") among ratios $\varepsilon'$ that are larger than the ratio $\varepsilon$ that has been calculated among the ratios $\varepsilon'$ included in the table.

The elevation calculation processing unit 36 calculates elevation $\theta_{tgt}$ that corresponds to the ratio $\varepsilon$ that has been calculated by performing an interpolation process using elevation $\theta'$ that corresponds to the ratio $\varepsilon'_1$ that has been searched for and elevation $\theta'$ that corresponds to the ratio $\varepsilon'_2$ that has been searched for. Since the interpolation process itself is known technology, detailed description thereof will be omitted.

Having received the digital signals 25-1 to 25-N from the A/D converters 24-1 to 24-N, the azimuth calculating unit 5 calculates azimuth $\varphi_{tgt}$ of the target by performing DBF processing using the N digital signals 25-1 to 25-N (step ST8 in FIG. 7). Since the DBF processing itself is known technology, detailed description thereof will be omitted.

The azimuth calculating unit 5 outputs azimuth $\varphi_{tgt}$ of the target that has been calculated to the display 6.

Here, the azimuth calculating unit 5 calculates azimuth $\varphi_{tgt}$ of the target by performing DBF processing. However, this is merely an example, and the azimuth calculating unit 5 may calculate azimuth $\varphi_{tgt}$ of the target by performing MIMO processing using the digital signals 25-1 to 25-N.

It is possible to suppress occurrence of grating lobes in a case where the azimuth calculating unit 5 performs DBF processing or MIMO processing.

It is also possible to broaden the antenna aperture in the azimuth direction in a case where the azimuth calculating unit 5 performs DBF processing or MIMO processing, and it is also possible to calculate the azimuth $\varphi_{tgt}$ of the target with a higher resolution than in a case where the azimuth $\varphi_{tgt}$ of the target is calculated from one reception signal.

In the angle measuring device 1 illustrated in FIG. 1, the azimuth calculating unit 5 acquires the digital signals 25-1 to 25-N output from the A/D converters 24-1 to 24-N. However, this is merely an example, and the azimuth calculating unit 5 may acquire the first demodulated signal $S_1$ or the second demodulated signal $S_2$ extracted by the signal extracting unit 31. In a case where the azimuth calculating unit 5 acquires the first demodulated signal $S_1$ or the second demodulated signal $S_2$, the signal extracting unit 31 extracts the first demodulated signal $S_1$ or the second demodulated signal $S_2$ from each of two or more digital signals 25-n out of the digital signals 25-1 to 25-N. In order to calculate the azimuth $\varphi_{tgt}$ of the target with a high resolution, it is desirable that the signal extracting unit 31 extracts N first demodulated signals $S_1$ or N second demodulated signals $S_2$ from all of the digital signals 25-1 to 25-N.

The azimuth calculating unit 5 calculates the azimuth $\varphi_{tgt}$ of the target by performing DBF processing or MIMO processing using the two or more first demodulated signals $S_1$ or the two or more second demodulated signals $S_2$ extracted by the signal extracting unit 31.

The display 6 displays, for example, elevation $\theta_{tgt}$ of the target output from the elevation calculating unit 32 and azimuth $\varphi_{tgt}$ of the target output from the azimuth calculating unit 5.

In the above first embodiment, the angle measuring device 1 includes: the signal extracting unit 31 for extracting a signal that includes the first reflection wave 20-1 and does not include the second reflection wave 20-2, as the first demodulated signal, and a signal that includes the second reflection wave 20-2 and does not include the first reflection wave 20-1, as the second demodulated signal, out of reception signals 22-n output from one or more reception antennas 21-n of the plurality of reception antennas 21-1 to 21-N; the elevation calculating unit 32 for calculating the elevation of a target by performing monopulse angle measurement using a sum signal of the first demodulated signal and the second demodulated signal and a difference signal between the first demodulated signal and the second demodulated signal; and the azimuth calculating unit 5 for calculating the azimuth of the target using reception signals 22-1 to 22-N output from the plurality of reception antennas 21-1 to 21-N. Therefore, the angle measuring device 1 can calculate the azimuth of a target with higher resolution, than in a case of using one reception antenna, while calculating the elevation of the target.

Figure 11:
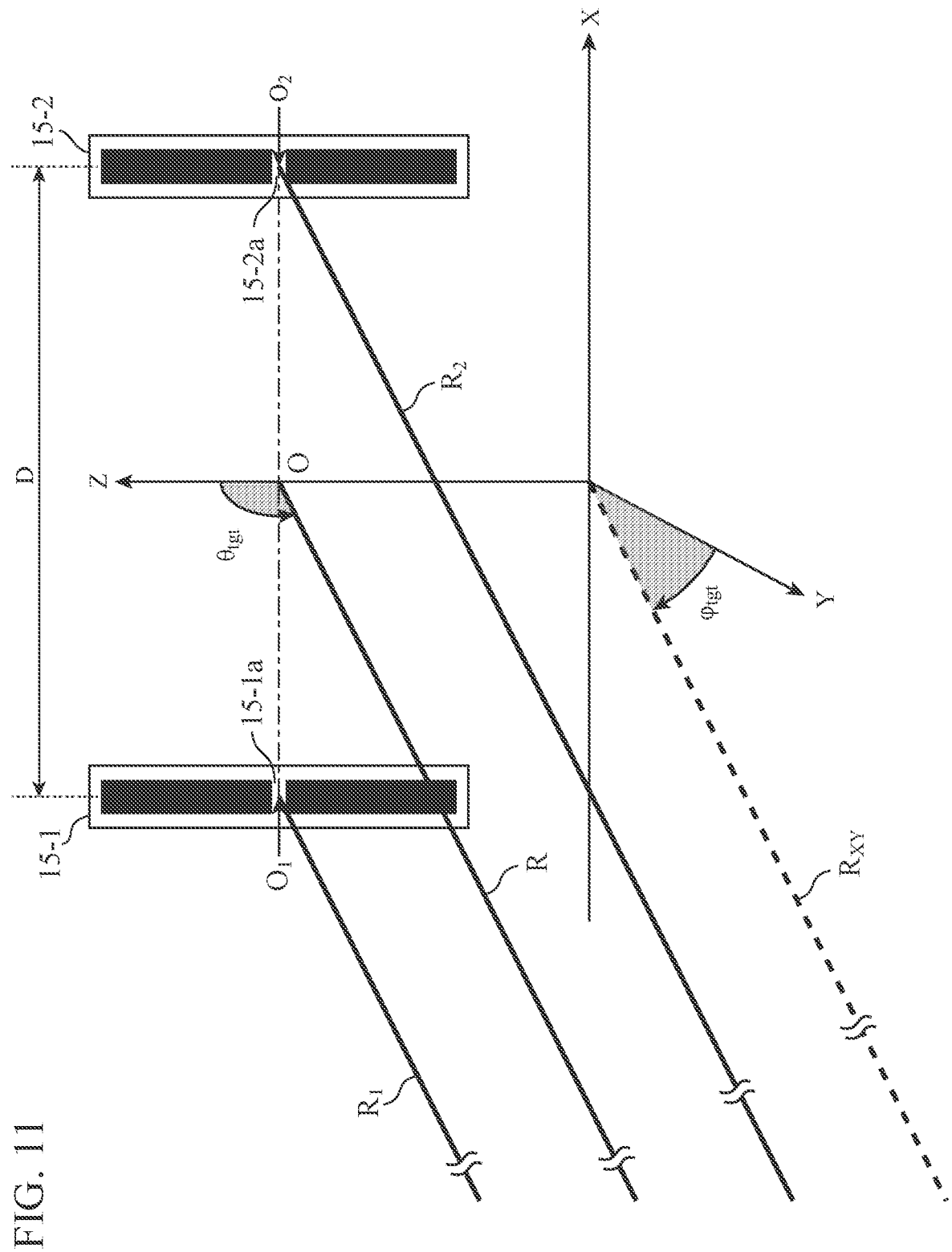
FIG. 11 is an explanatory diagram illustrating the phase center and other information of each of the first transmission antenna 15-1, the second transmission antenna 15-2, and a reception antenna 21-n.

In the angle measuring device 1 illustrated in FIG. 1, the installation position of the first transmission antenna 15-1 in the elevation direction and the installation position of the second transmission antenna 15-2 in the elevation direction are the same as illustrated in FIGS. 4 and 8. If the installation positions in the elevation direction are the same, as illustrated in FIG. 11, the Z-axis position of the first transmission antenna 15-1 at a phase center $O_1$ and the Z-axis position of the second transmission antenna 15-2 at a phase center $O_2$ are equal to each other. Therefore, in the elevation direction, no phase difference is generated between the phase center $O_1$ and the phase center $O_2$.

FIG. 11 is an explanatory diagram illustrating the phase center and other information of each of the first transmission antenna 15-1, the second transmission antenna 15-2, and a reception antenna 21-n.

However, since the first transmission antenna 15-1 and the second transmission antenna 15-2 are installed at positions apart by interval D, there are cases where there is a difference between the distance from the first transmission antenna 15-1 to the target and the distance from the second transmission antenna 15-2 to the target.

In a case where there is a difference between the distance from the first transmission antenna 15-1 to the target and the distance from the second transmission antenna 15-2 to the target, there are cases where the phase center $O_1$ of the first demodulated signal $S_1$ and the phase center $O_2$ of the second demodulated signal $S_2$ are different in the azimuth direction.

As illustrated in FIG. 11, let us assume that the distance between the phase center $O_1$ of the first transmission antenna 15-1 and a target is $R_1$, that the distance between the phase center $O_2$ of the second transmission antenna 15-2 and the target is $R_2$, and that the distance between a phase center O of the reception antenna 21-n and the target is R. If the distance difference between the distance $R_1$ and the distance R is $\Delta R_1$ and the distance difference between the distance $R_2$ and the distance R is $\Delta R_2$, the shift between the distance difference $\Delta R_1$ and the distance difference $\Delta R_2$ is the phase difference between the phase center $O_1$ and the phase center $O_2$ in the azimuth direction.

Let us assume that the phase center O of a reception antenna 21-n is a phase reference point. For example, let us assume a case where the phase center $O_1$ of the first transmission antenna 15-1 is separated from a phase reference point by a distance of $-D/2$ in the azimuth direction, and the phase center $O_2$ of the second transmission antenna 15-2 is separated by a distance of $+D/2$ from the phase reference point in the azimuth direction.

In this case, array response vector $v_1$ of the first transmission antenna 15-1 is expressed by Equation 5 below, and array response vector $v_2$ of the second transmission antenna 15-2 is expressed by Equation 6 below.

$$v_1 = \exp\left\{j\frac{2\pi}{\lambda}\left(-\frac{D}{2}\sin\theta_{tgt}\sin\phi_{tgt}\right)\right\} \qquad (5)$$

$$v_2 = \exp\left\{j\frac{2\pi}{\lambda}\left(-\frac{D}{2}\sin\theta_{tgt}\sin\phi_{tgt}\right)\right\} \qquad (6)$$

In Equations 5 and 6, $\lambda$ denotes the wavelength at the center frequency of each of the first beam 16-1 and the second beam 16-2.

For example, by multiplying the first demodulated signal $S_1$ by the array response vector $v_1$ ($S_1 \times v_1$) and multiplying the second demodulated signal $S_2$ by the array response vector $v_2$ ($S_2 \times v_2$), the first transmission antenna 15-1 and the second transmission antenna 15-2 are phase-compensated so that X-axis positions thereof are virtually arranged at the same position.

There are cases where the calculation accuracy of elevation $\theta_{tgt}$ by the elevation calculating unit 32 is improved when the signal extracting unit 31 performs phase compensation so that the X-axis positions of the first transmission antenna 15-1 and the second transmission antenna 15-2 are virtually arranged at the same position.

However, in a case where the distance R between the phase center O of the reception antenna 21-$n$ and the target is sufficiently larger than the interval D between the first transmission antenna 15-1 and the second transmission antenna 15-2 (R>>D), far-field approximation can be applied, and thus each of the first demodulated signal $S_1$ and the second demodulated signal $S_2$ can be regarded as a plane wave. In this case, there is little influence on the angle measurement even if the signal extracting unit 31 does not perform phase compensation so that the X-axis positions of the first transmission antenna 15-1 and the second transmission antenna 15-2 are virtually arranged at the same position.

Second Embodiment

In the angle measuring device 1 illustrated in FIG. 1, the beam transmitting unit 2 radiates the first beam 16-1 and the second beam 16-2 simultaneously.

In a second embodiment, an angle measuring device 1 in which the beam transmitting unit 2 radiates the first beam 16-1 and the second beam 16-2 in a time-division manner will be described.

In the angle measuring device 1 of the second embodiment, for convenience of explanation, it is assumed that the beam transmitting unit 2 radiates the first beam 16-1 and then radiates the second beam 16-2.

The configuration of the angle measuring device 1 of the second embodiment is illustrated in FIG. 1 as in the first embodiment. Note that, in a case where the beam transmitting unit 2 radiates the first beam 16-1 and the second beam 16-2 in a time-division manner, each of the first demodulated signal $S_1$ and the second demodulated signal $S_2$ can be extracted without adding each of the first code $C_1$ and the second code $C_2$ to the local oscillation signal. Therefore, the angle measuring device 1 may not include the code modulation unit 12; however, the first code $C_1$ and the second code $C_2$ may be each added to the local oscillation signal, and thus the angle measuring device 1 may include the code modulation unit 12.

First, the first transmission antenna 15-1 radiates the first beam 16-1 into space as in the first embodiment.

The first beam 16-1 radiated from the first transmission antenna 15-1 is reflected by the target, and the first beam 16-1 reflected by the target is received by each of the reception antennas 21-1 to 21-N as the first reflection wave 20-1.

Having received the first reflection wave 20-1, a reception antenna 21-$n$ (n=1, . . . , N) outputs a reception signal 22-$n$ including the first reflection wave 20-1 to a receiver 23-$n$.

The receiver 23-$n$ reduces the frequency of the reception signal 22-$n$ output from the reception antenna 21-$n$, for example, from an RF to an IF using the local oscillation signal output from the local oscillation signal generating unit 11.

The receiver 23-$n$ outputs the reception signal 22-$n$ after the frequency reduction to an A/D converter 24-$n$.

Having received the reception signal 22-$n$ after the frequency reduction from the receiver 23-$n$, the A/D converter 24-$n$ converts the reception signal 22-$n$ after the frequency reduction from an analog signal to a digital signal 25-$n$ and outputs the digital signal 25-$n$ to each of the signal processor 4 and the azimuth calculating unit 5.

The signal extracting unit 31 outputs each of one or more digital signals 25-$n$ among digital signals 25-1 to 25-N output from the A/D converters 24-1 to 24-N to the elevation calculating unit 32 as the first demodulated signal $S_1$.

Having received the digital signals 25-1 to 25-N from the A/D converters 24-1 to 24-N, the azimuth calculating unit 5 calculates azimuth $\varphi_{tgt}$ of the target by performing DBF processing or MIMO processing using the digital signals 25-1 to 25-N as in the first embodiment.

Next, the second transmission antenna 15-2 radiates the second beam 16-2 into space as in the first embodiment.

The second beam 16-2 radiated from the second transmission antenna 15-2 is reflected by the target, and the second beam 16-2 reflected by the target is received by each of the reception antennas 21-1 to 21-N as the second reflection wave 20-2.

Having received the second reflection wave 20-2, a reception antenna 21-$n$ outputs a reception signal 22-$n$ including the second reflection wave 20-2 to a receiver 23-$n$.

The receiver 23-$n$ reduces the frequency of the reception signal 22-$n$ output from the reception antenna 21-$n$, for example, from an RF to an IF using the local oscillation signal output from the local oscillation signal generating unit 11.

The receiver 23-$n$ outputs the reception signal 22-$n$ after the frequency reduction to an A/D converter 24-$n$.

Having received the reception signal 22-$n$ after the frequency reduction from the receiver 23-$n$, the A/D converter 24-$n$ converts the reception signal 22-$n$ after the frequency reduction from an analog signal to a digital signal 25-$n$ and outputs the digital signal 25-$n$ to each of the signal processor 4 and the azimuth calculating unit 5.

The signal extracting unit 31 outputs each of one or more digital signals 25-$n$ among the digital signals 25-1 to 25-N output from the A/D converters 24-1 to 24-N to the elevation calculating unit 32 as the second demodulated signal $S_2$.

Having received the digital signals 25-1 to 25-N from the A/D converters 24-1 to 24-N, the azimuth calculating unit 5 calculates azimuth $\varphi_{tgt}$ of the target by performing DBF processing or MIMO processing using the digital signals 25-1 to 25-N as in the first embodiment.

The contents of processing by the elevation calculating unit 32 are similar to those of the first embodiment, and thus detailed description thereof is omitted.

Also in the angle measuring device 1 which includes the beam transmitting unit 2 for radiating the first beam 16-1 and the second beam 16-2 in a time-division manner, it is possible to calculate the azimuth of a target with a higher resolution than in a case of using a single reception antenna while calculating the elevation of the target as in the angle measuring device 1 of the first embodiment.

In a case where the angle measuring device 1 does not include the code modulation unit 12, the processing load is reduced as compared with the angle measuring device 1 of the first embodiment.

Third Embodiment

In the angle measuring device 1 illustrated in FIG. 1, the frequency of the first beam 16-1 radiated from the first transmission antenna 15-1 and the frequency of the second beam 16-2 radiated from the second transmission antenna 15-2 are almost the same.

In a third embodiment, description will be given on an angle measuring device 1 in which the frequency of the first beam 16-1 radiated from the first transmission antenna 15-1 and the frequency of the second beam 16-2 radiated from the second transmission antenna 15-2 are different.

It is assumed that the frequency of the first beam 16-1 is a first frequency and that the frequency of the second beam 16-2 is a second frequency.

The configuration of the angle measuring device 1 of the third embodiment is illustrated in FIG. 1 as in the first embodiment. However, in a case where the frequency of the first beam 16-1 radiated from the first transmission antenna 15-1 and the frequency of the second beam 16-2 radiated from the second transmission antenna 15-2 are different, it is possible to extract each of the first demodulated signal $S_1$ and the second demodulated signal $S_2$ without adding each of the first code $C_1$ and the second code $C_2$ to the local oscillation signal. Therefore, the angle measuring device 1 may not include the code modulation unit 12; however, the first code $C_1$ and the second code $C_2$ may be each added to the local oscillation signal, and thus the angle measuring device 1 may include the code modulation unit 12.

The beam receiving unit 3 operates in a similar manner to that in the first embodiment.

The signal extracting unit 31 converts each of digital signals 25-$n$ into a signal in the frequency domain by performing, for example, an FFT on each of one or more digital signals 25-$n$ among the digital signals 25-1 to 25-N output from the A/D converters 24-1 to 24-N.

The signal extracting unit 31 extracts a signal of the first frequency from each of the signals in the frequency domain and extracts a signal of the second frequency from each of the signals in the frequency domain.

The signal extracting unit 31 converts each of the signals of the first frequency into a signal in the time domain by, for example, performing an inverse FFT on each of the signals in the first frequency that have been extracted and outputs each of the signals in the time domain to the elevation calculating unit 32 as the first demodulated signal $S_1$.

The signal extracting unit 31 also converts each of the signals of the second frequency into a signal in the time domain by, for example, performing an inverse FFT on each of the signals in the second frequency that have been extracted and outputs each of the signals in the time domain to the elevation calculating unit 32 as the second demodulated signal $S_2$.

Here, the signal extracting unit 31 outputs a signal in the time domain as the first demodulated signal $S_1$ to the elevation calculating unit 32 and outputs a signal in the time domain signal as the second demodulated signal $S_2$ to the elevation calculating unit 32. However, this is merely an example, and the Fourier transform unit 33 of the elevation calculating unit 32 is unnecessary if the signal extracting unit 31 outputs each signal of the first frequency that has been extracted to the elevation calculating unit 32 and outputs each signal of the second frequency that has been extracted to the elevation calculating unit 32.

Having received the digital signals 25-1 to 25-N from the A/D converters 24-1 to 24-N, the azimuth calculating unit 5 calculates azimuth $\varphi_{tgt}$ of a target by performing DBF processing using the digital signals 25-1 to 25-N as in the first embodiment.

The azimuth calculating unit 5 may extract the first demodulated signal $S_1$ or the second demodulated signal $S_2$ from all of the digital signals 25-1 to 25-N, for example, in a similar manner to that of the signal extracting unit 31 using the digital signals 25-1 to 25-N before performing DBF processing or the like.

In a case where N first demodulated signals $S_1$ or N second demodulated signals $S_2$ are extracted, the azimuth calculating unit 5 performs DBF processing or MIMO processing using the N first demodulated signals $S_1$ or the N second demodulated signals $S_2$.

Also in the angle measuring device 1 in which the frequency of the first beam 16-1 radiated from the first transmission antenna 15-1 and the frequency of the second beam 16-2 radiated from the second transmission antenna 15-2 are different, it is possible to calculate the azimuth of a target with a higher resolution than in a case of using a single reception antenna while calculating the elevation of the target as in the angle measuring device 1 of the first embodiment.

In a case where the angle measuring device 1 does not include the code modulation unit 12, the processing load is reduced as compared with the angle measuring device 1 of the first embodiment.

Fourth Embodiment

The angle measuring device 1 illustrated in FIG. 1 includes the first transmission antenna 15-1 having one antenna aperture 15-1$a$ and the second transmission antenna 15-2 having one antenna aperture 15-2$a$.

In a fourth embodiment, description will be given on an angle measuring device 1 including a first transmission antenna 61-1 having two antenna apertures in the elevation direction and a second transmission antenna 61-2 having two antenna apertures in the elevation direction.

Figure 12:
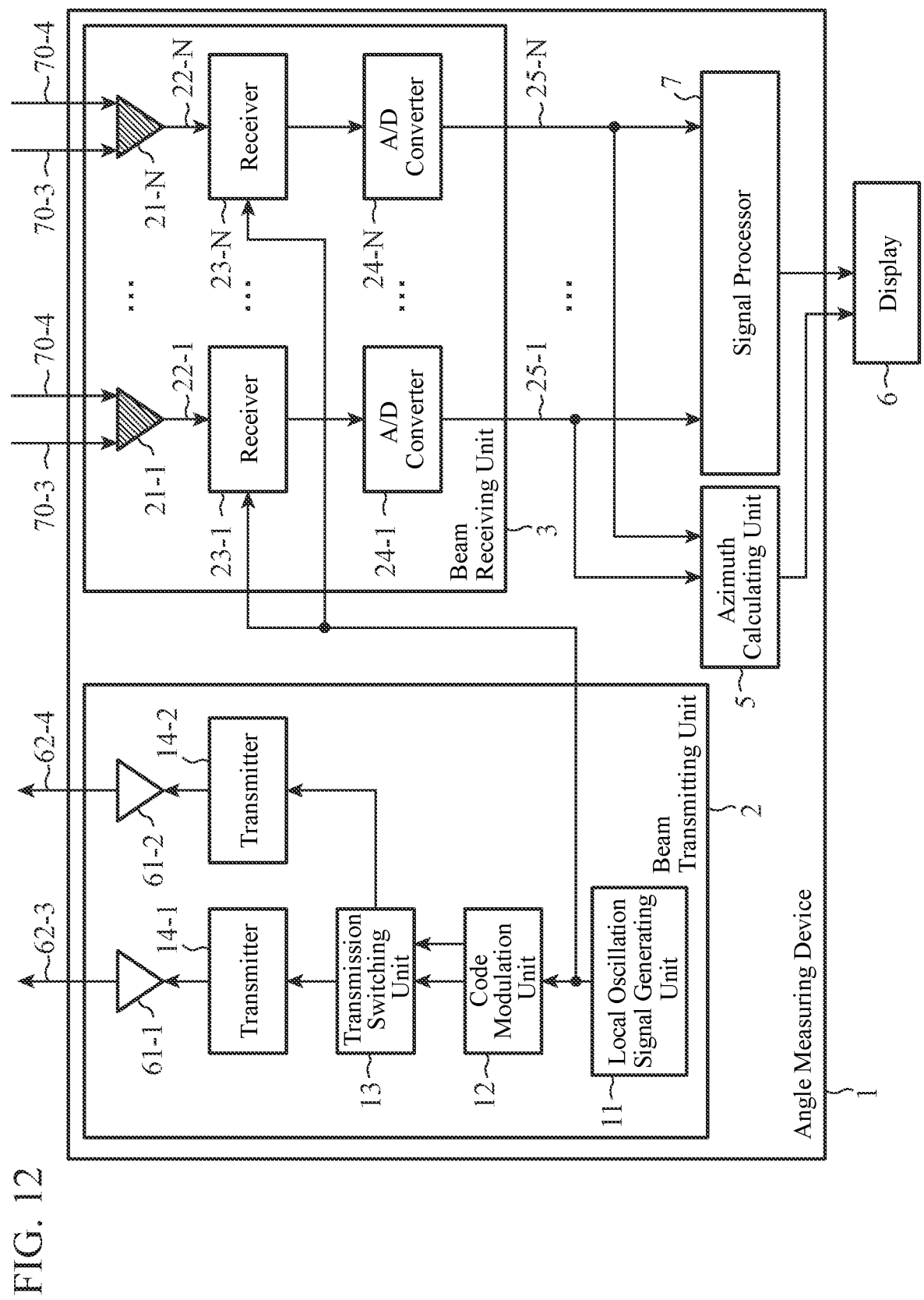
FIG. 12 is a configuration diagram illustrating an angle measuring device 1 according to a fourth embodiment.

FIG. 12 is a configuration diagram illustrating the angle measuring device 1 according to the fourth embodiment. In FIG. 12, the same symbol as that in FIG. 1 represents the same or a corresponding part, and thus description thereof is omitted.

Figure 13:
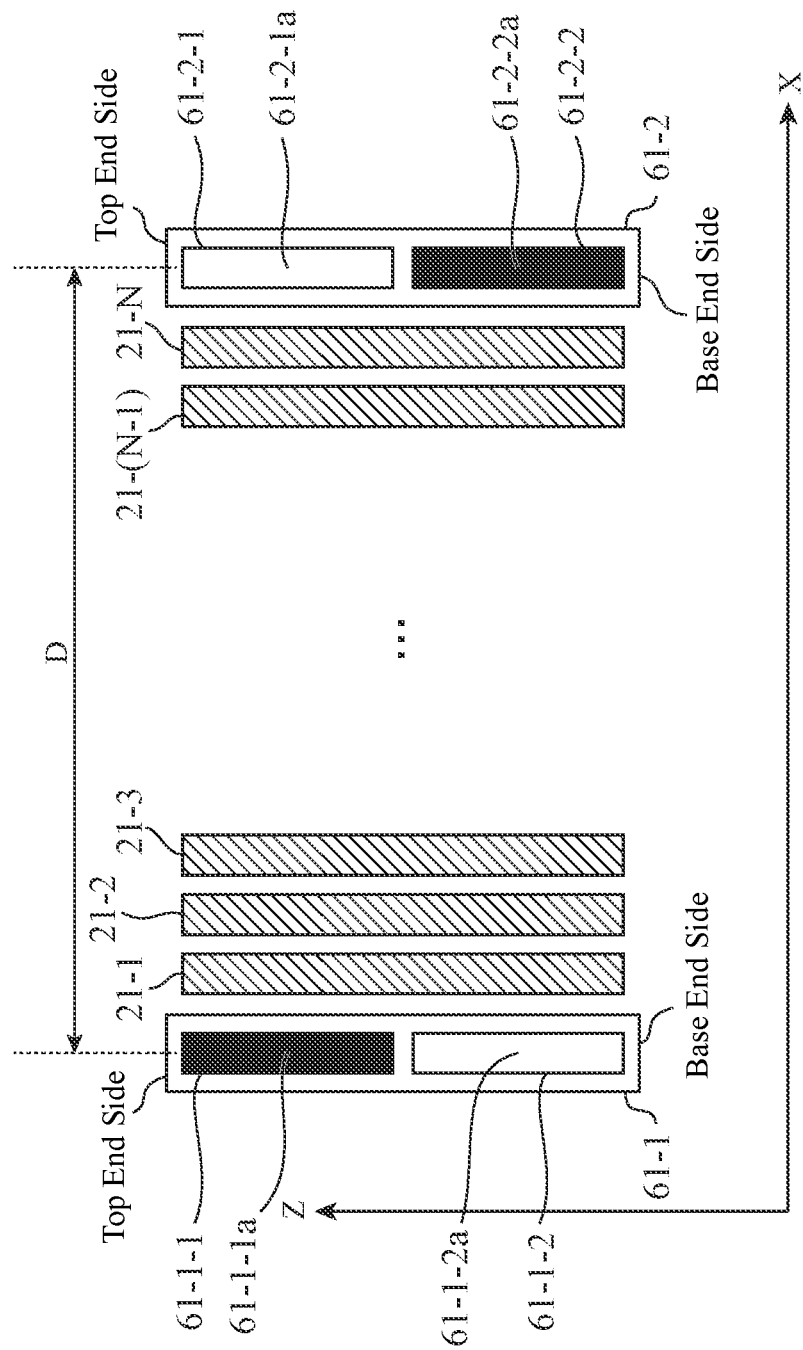
FIG. 13 is an explanatory diagram illustrating an arrangement example of a first transmission antenna 61-1, a second transmission antenna 61-2, and reception antennas 21-1 to 21-N.

FIG. 13 is an explanatory diagram illustrating an arrangement example of the first transmission antenna 61-1, the second transmission antenna 61-2, and the reception antennas 21-1 to 21-N.

Figure 14:
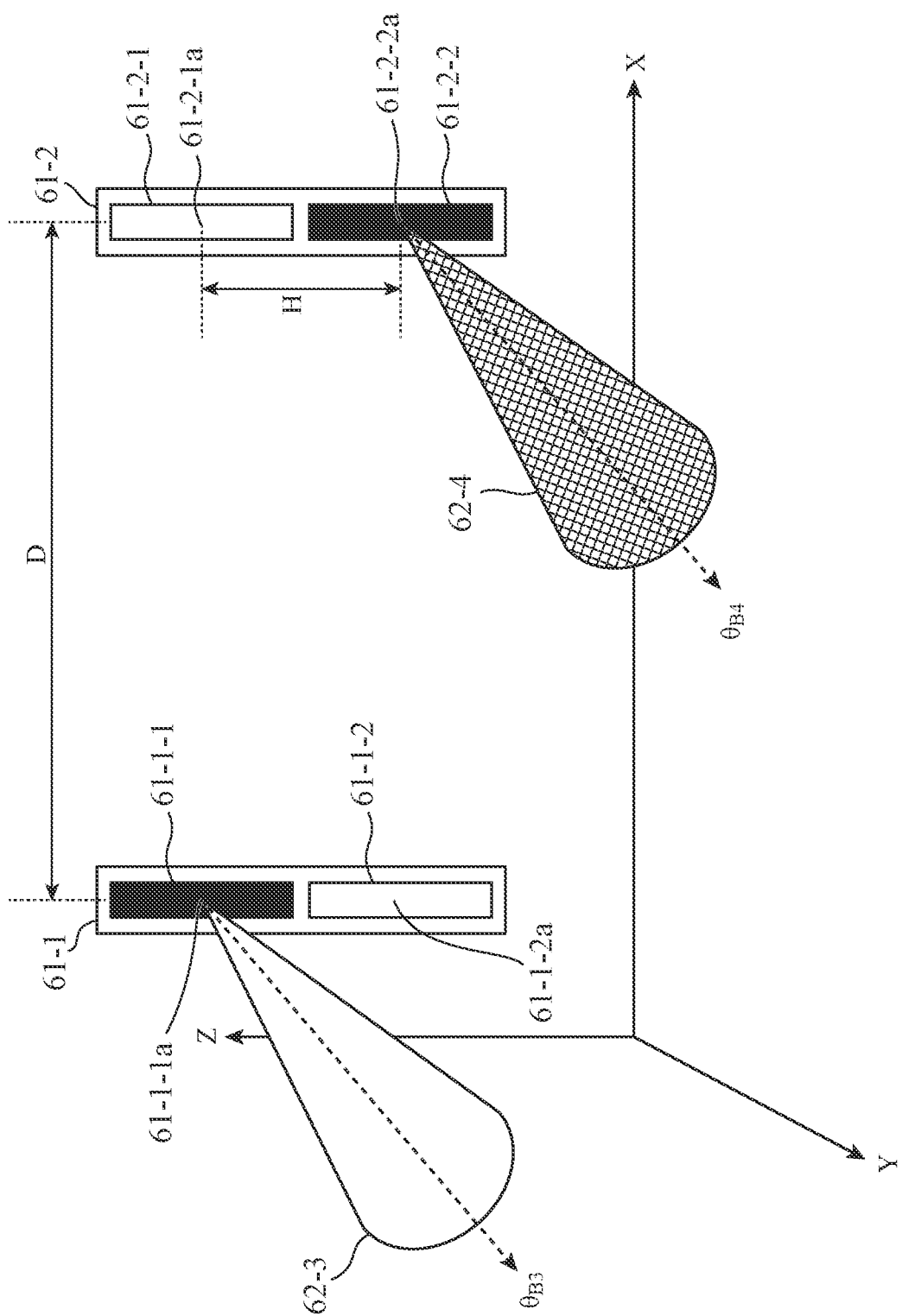
FIG. 14 is an explanatory diagram illustrating elevation angle $\theta_{B3}$ in the radiation direction of a first beam 62-3 and elevation angle $\theta_{B4}$ in the radiation direction of a second beam 62-4.
Figure 15:
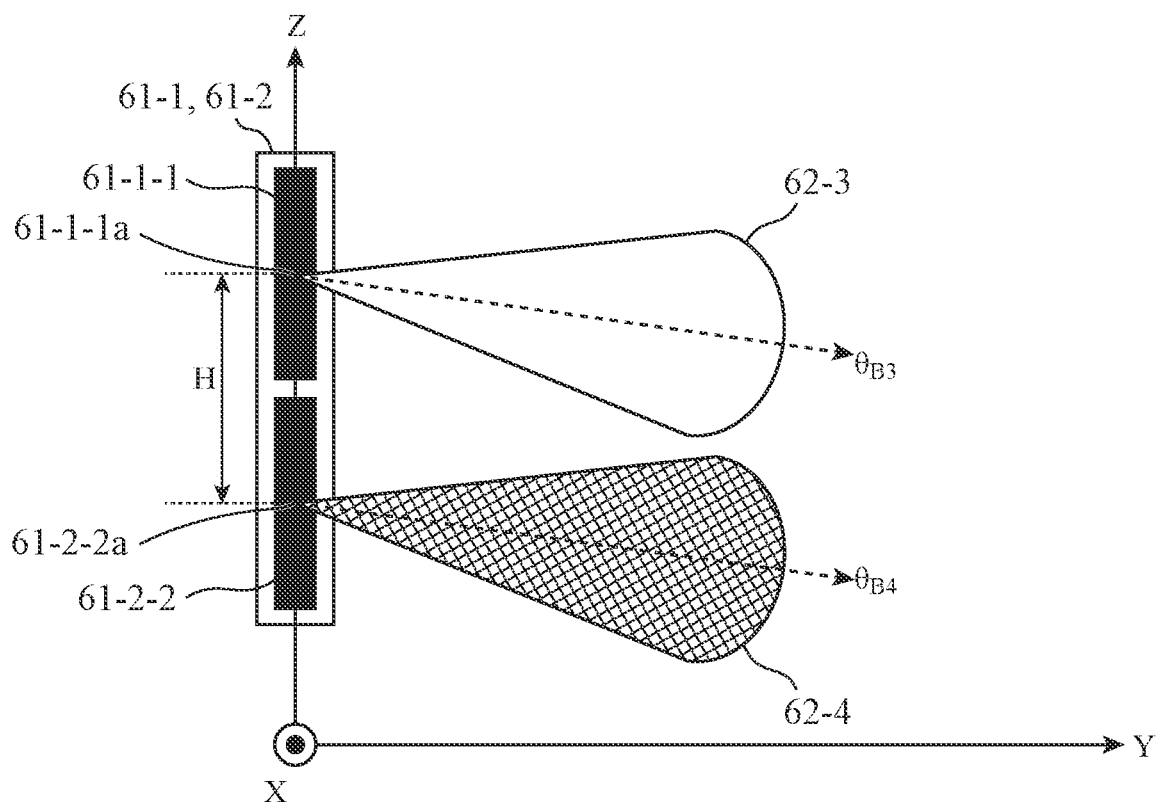
FIG. 15 is an explanatory diagram illustrating an example of elevation angle $\theta_{B3}$ in the radiation direction of the first beam 62-3 and elevation angle $\theta_{B4}$ in the radiation direction of the second beam 62-4.

FIGS. 14 and 15 are explanatory diagrams illustrating an example of elevation angle $\theta_{B3}$ in the radiation direction of a first beam 62-3 and elevation angle $\theta_{B4}$ in the radiation direction of a second beam 62-4.

In FIG. 15, it is illustrated that the first transmission antenna 61-1 and the second transmission antenna 61-2 are installed at the same position in order to facilitate understanding that the elevation angle $\theta_{B3}$ and the elevation angle $\theta_{B4}$ are the same angle.

The first transmission antenna 61-1 has two antenna elements 61-1-1 and 61-1-2 and has two antenna apertures 61-1-1$a$ and 61-1-2$a$ in the elevation direction.

Of the two antenna apertures 61-1-1$a$ and 61-1-2$a$, the antenna aperture 61-1-1$a$ on the top end side is a first antenna aperture, and the antenna aperture 61-1-2$a$ on the base end side is a second antenna aperture.

The first transmission antenna 61-1 radiates a third beam 62-3 into space from the antenna aperture 61-1-1$a$.

In the angle measuring device 1 illustrated in FIG. 12, the first transmission antenna 61-1 radiates the third beam 62-3 from the antenna aperture 61-1-1$a$ into space. However, this is merely an example, and the first transmission antenna 61-1 may radiate a fifth beam from the antenna aperture 61-1-2$a$ into space.

The second transmission antenna 61-2 has two antenna elements 61-2-1 and 61-2-2 and has two antenna apertures 61-2-1a and 61-2-2a in the elevation direction.

Of the two antenna apertures 61-2-1a and 61-2-2a, the antenna aperture 61-2-1a on the top end side is a third antenna aperture, and the antenna aperture 61-2-2a on the base end side is a fourth antenna aperture.

The second transmission antenna 61-2 radiates the fourth beam 62-4 from the antenna aperture 61-2-2a into space in a case where the third beam 62-3 is radiated from the antenna aperture 61-1-1a.

The second transmission antenna 61-2 radiates a sixth beam into space from the antenna aperture 61-2-1a in a case where a fifth beam is radiated from the antenna aperture 61-1-2a.

In the examples of FIGS. 14 and 15, the third beam 62-3 is radiated from the antenna aperture 61-1-1a, and the fourth beam 62-4 is radiated from the antenna aperture 61-2-2a.

The installation position of the first transmission antenna 61-1 in the elevation direction and the installation position of the second transmission antenna 61-2 in the elevation direction are the same as illustrated in FIGS. 13 and 14.

The installation position of the first transmission antenna 61-1 in the azimuth direction and the installation position of the second transmission antenna 61-2 in the azimuth direction are different as illustrated in FIGS. 13 and 14.

In the examples of FIGS. 13 and 14, the arrangement interval between the first transmission antenna 61-1 and the second transmission antenna 61-2 is D.

The elevation angle in the radiation direction of the third beam 62-3 is $\theta_{B3}$ as illustrated in FIGS. 14 and 15, the elevation angle in the radiation direction of the fourth beam 62-4 is $\theta_{B4}$ as illustrated in FIGS. 14 and 15, and $\theta_{B3} = \theta_{B4}$ holds.

The elevation angle in the radiation direction of the fifth beam and the elevation angle in the radiation direction of the sixth beam are the same angle.

In the angle measuring device 1 illustrated in FIG. 12, the third beam 62-3 and the fourth beam 62-4 are simultaneously radiated from the first transmission antenna 61-1 and the second transmission antenna 61-2, respectively.

The third beam 62-3 radiated from the third transmission antenna 62-3 is reflected by a target, and the third beam 62-3 reflected by the target is received by each of the reception antennas 21-1 to 21-N as a third reflection wave 70-3.

The fourth beam 62-4 radiated from the second transmission antenna 61-2 is reflected by the target, and the fourth beam 62-4 reflected by the target is received by each of the reception antennas 21-1 to 21-N as a fourth reflection wave 70-4.

The first transmission antenna 61-1 may radiate the fifth beam from the antenna aperture 61-1-2a instead of the third beam 62-3, and the second transmission antenna 61-2 may radiate the sixth beam from the antenna aperture 61-2-1a instead of the fourth beam 62-4.

In a case where the fifth and sixth beams are simultaneously radiated from the first transmission antenna 61-1 and the second transmission antenna 61-2, respectively, the fifth beam is reflected by a target, and the fifth beam reflected by the target is received by each of reception antennas 21-1 to 21-N as a fifth reflection wave.

The sixth beam is reflected by the target, and the sixth beam reflected by the target is received by each of the reception antennas 21-1 to 21-N as a sixth reflection wave.

Having received each of the third reflection wave 70-3 and the fourth reflection wave 70-4, a reception antenna 21-n (n=1, . . . , N) outputs a reception signal 22-n including the third reflection wave 70-3 and the fourth reflection wave 70-4 to a receiver 23-n.

Figure 16:
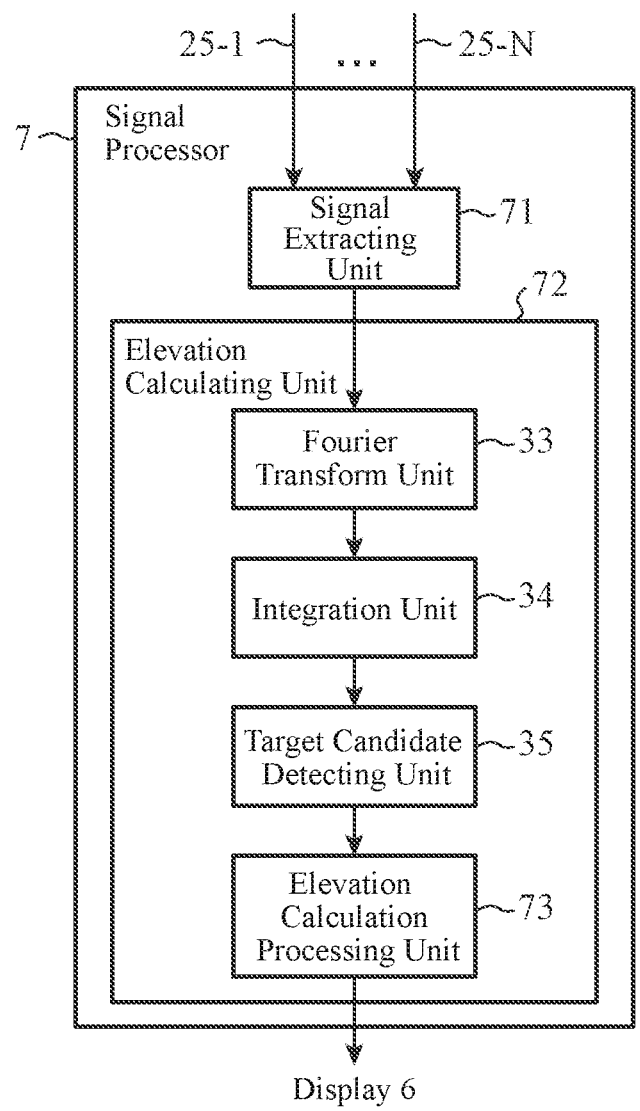
FIG. 16 is a configuration diagram illustrating a signal processor 7 in the angle measuring device 1 according to the fourth embodiment.

As illustrated in FIG. 16, a signal processor 7 includes a signal extracting unit 71 and an elevation calculating unit 72.

FIG. 16 is a configuration diagram illustrating the signal processor 7 in the angle measuring device 1 according to the fourth embodiment. In FIG. 16, the same symbol as that in FIG. 5 represents the same or a corresponding part, and thus description thereof is omitted.

The signal extracting unit 71 is implemented by, for example, the signal extracting circuit 41 illustrated in FIG. 2.

The signal extracting unit 71 includes, for example, an internal memory that stores the first code $C_1$ and the second code $C_2$.

The signal extracting unit 71 extracts a first demodulated signal $S_1$ using the first code $C_1$ from each of one or more digital signals 25-n among digital signals 25-1 to 25-N output from A/D converters 24-1 to 24-N.

The signal extracting unit 71 also extracts a second demodulated signal $S_2$ using the second code $C_2$ from each of the one or more digital signals 25-n.

The signal extracting unit 71 compensates each of the phase of the first demodulated signal $S_1$ and the phase of the second demodulated signal $S_2$ on the basis of the distance in the azimuth direction between a reception antenna 21-n and the first transmission antenna 61-1, the distance in the azimuth direction between the reception antenna 21-n and the second transmission antenna 61-2, and the distance in the elevation direction between the phase center of the antenna element 61-1-1 and the phase center of the antenna element 61-2-2.

The reception antenna 21-n refers to a reception antenna that has output a reception signal 22-n from which the first demodulated signal $S_1$ and the second demodulated signal $S_2$ have been extracted.

The signal extracting unit 71 outputs, to the elevation calculating unit 72, one or more first demodulated signals $S_1$ that have been phase-compensated and one or more second demodulated signals $S_2$ that have been phase-compensated.

In the angle measuring device 1 illustrated in FIG. 12, the first demodulated signal $S_1$ includes the third reflection wave 70-3 and does not include the fourth reflection wave 70-4, and the second demodulated signal $S_2$ includes the fourth reflection wave 70-4 and does not include the third reflection wave 70-3.

Here, the signal extracting unit 71 includes an internal memory that stores the first code $C_1$ and the second code $C_2$. However, this is merely an example, and the signal extracting unit 71 may receive each of the first code $C_1$ and the second code $C_2$ from the outside of the device.

The elevation calculating unit 72 includes a Fourier transform unit 33, an integration unit 34, a target candidate detecting unit 35, and an elevation calculation processing unit 73.

The elevation calculating unit 72 calculates elevation $\theta_{tgt}$ of the target by performing monopulse angle measurement using a sum signal of the first demodulated signal $S_1$ and the second demodulated signal $S_2$ and a difference signal between the first demodulated signal $S_1$ and the second demodulated signal $S_2$.

The elevation calculating unit 72 outputs elevation $\theta_{tgt}$ of the target that has been calculated to a display 6.

The elevation calculation processing unit 73 is implemented by, for example, the elevation calculation processing circuit 45 illustrated in FIG. 2.

The elevation calculation processing unit 73 calculates a sum signal $\Sigma(\theta_{tgt})$ of the first target signal $M_1(\theta_{tgt})$ and the second target signal $M_2(\theta_{tgt})$ output from the target candidate detecting unit 35.

The elevation calculation processing unit 73 calculates a difference signal $\Delta(\theta_{tgt})$ between the first target signal $M_1(\theta_{tgt})$ and the second target signal $M_2(\theta_{tgt})$ output from the target candidate detecting unit 35.

The elevation calculation processing unit 73 calculates elevation $\theta_{tgt}$ of the target by performing phase-comparison monopulse angle measurement using the sum signal $\Sigma(\theta_{tgt})$ and the difference signal $\Delta(\theta_{tgt})$.

The elevation calculation processing unit 73 outputs elevation $\theta_{tgt}$ of the target that has been calculated to the display 6.

In FIGS. 12 and 16, it is assumed that each of the signal extracting unit 71, the Fourier transform unit 33, the integration unit 34, the target candidate detecting unit 35, and the elevation calculation processing unit 73, which are components of the signal processor 7, and the azimuth calculating unit 5 is implemented by dedicated hardware as illustrated in FIG. 2. That is, it is assumed that the components of the signal processor 7 and the azimuth calculating unit 5 are implemented by the signal extracting circuit 41, the Fourier transform circuit 42, the integration circuit 43, the target candidate detecting circuit 44, the elevation calculation processing circuit 45, and the azimuth calculating circuit 46.

Here, each of the signal extracting circuit 41, the Fourier transform circuit 42, the integration circuit 43, the target candidate detecting circuit 44, the elevation calculation processing circuit 45, and the azimuth calculating circuit 46 corresponds to, for example, a single circuit, a composite circuit, a programmed processor, a parallel programmed processor, an ASIC, an FPGA, or a combination thereof.

The components of the signal processor 7 and the azimuth calculating unit 5 are not limited to implementation by dedicated hardware, and the components of the signal processor 7 and the azimuth calculating unit 5 may be implemented by software, firmware, or a combination of software and firmware.

In a case where the components of the signal processor 7 and the azimuth calculating unit 5 are implemented by software, firmware, or the like, programs for causing the computer to execute processing procedures performed in the signal extracting unit 71, the Fourier transform unit 33, the integration unit 34, the target candidate detecting unit 35, the elevation calculation processing unit 73, and the azimuth calculating unit 5 are stored in the memory 51 illustrated in FIG. 6. Then, the processor 52 illustrated in FIG. 6 executes the programs stored in the memory 51.

Figure 17:
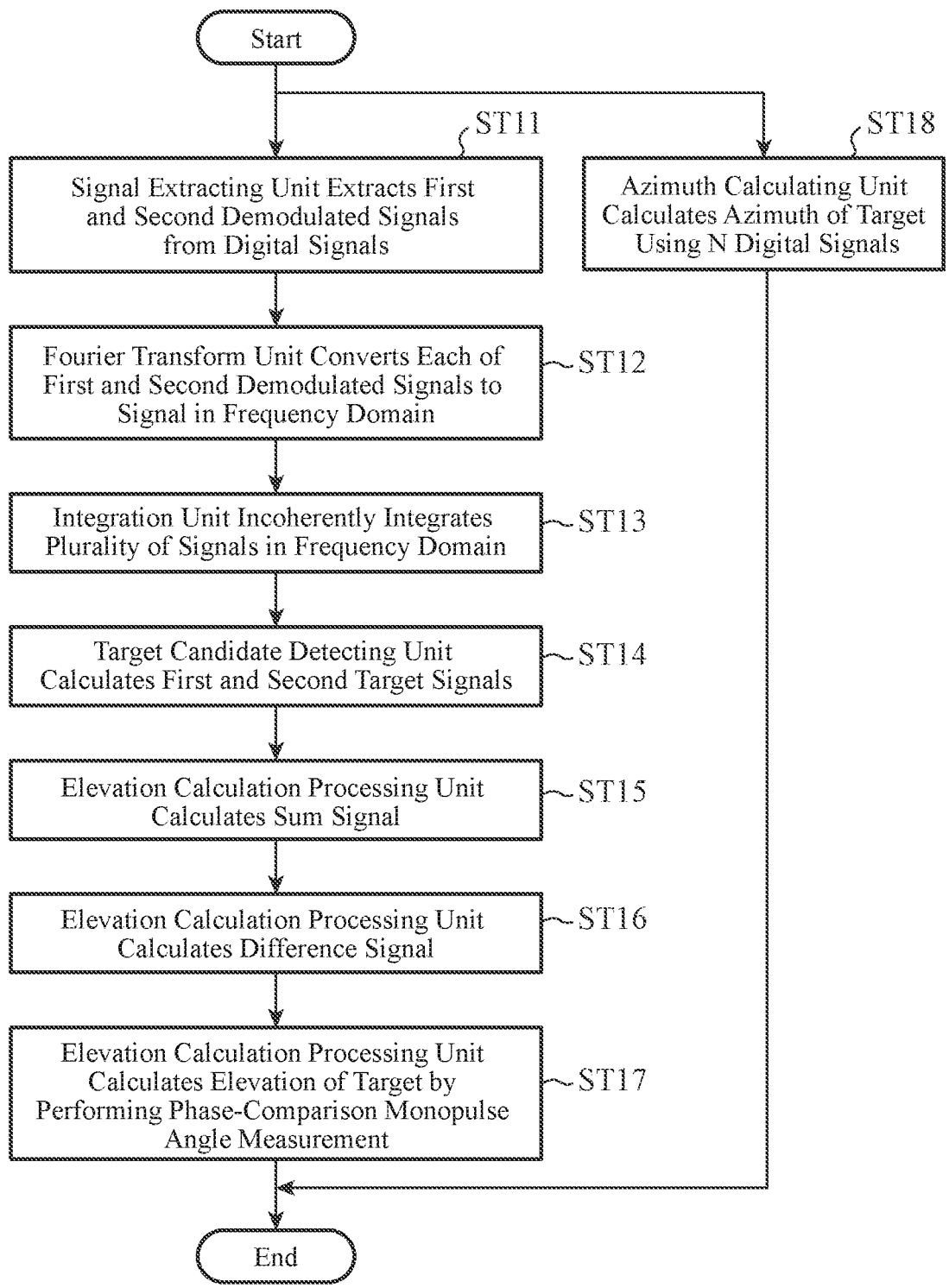
FIG. 17 is a flowchart illustrating an angle measuring method which is a processing procedure performed in the signal processor 7 and an azimuth calculating unit 5.

FIG. 17 is a flowchart illustrating an angle measuring method which is a processing procedure performed in the signal processor 7 and the azimuth calculating unit 5.

Meanwhile, in FIG. 2, an example is illustrated in which each of the components of the signal processor 7 and the azimuth calculating unit 5 is implemented by dedicated hardware, and in FIG. 6, an example is illustrated in which the signal processor 7 and the azimuth calculating unit 5 are implemented by software, firmware, or the like. However, this is merely an example, and some components in the signal processor 7 or the azimuth calculating unit 5 may be implemented by dedicated hardware, and the other components may be implemented by software, firmware, or the like.

Next, the operation of the angle measuring device 1 illustrated in FIG. 12 will be described.

In the angle measuring device 1 illustrated in FIG. 12, the first transmission antenna 61-1 radiates the third beam 62-3 from the antenna aperture 61-1-1a into space, and the second transmission antenna 61-2 radiates the fourth beam 62-4 from the antenna aperture 61-2-2a into space.

The third beam 62-3 radiated from the first transmission antenna 61-1 is reflected by the target, and the third beam 62-3 reflected by the target is received by each of the reception antennas 21-1 to 21-N as a third reflection wave 70-3.

The fourth beam 62-4 radiated from the second transmission antenna 61-2 is reflected by the target, and the fourth beam 62-4 reflected by the target is received by each of the reception antennas 21-1 to 21-N as a fourth reflection wave 70-4.

Having received each of the third reflection wave 70-3 and the fourth reflection wave 70-4, a reception antenna 21-$n$ (n=1, . . . , N) outputs a reception signal 22-$n$ including the third reflection wave 70-3 and the fourth reflection wave 70-4 to a receiver 23-$n$.

The receiver 23-$n$ reduces the frequency of the reception signal 22-$n$ output from the reception antenna 21-$n$, for example, from an RF to an IF using the local oscillation signal output from the local oscillation signal generating unit 11.

The receiver 23-$n$ outputs the reception signal 22-$n$ after the frequency reduction to an A/D converter 24-$n$.

Having received the reception signal 22-$n$ after the frequency reduction from the receiver 23-$n$, the A/D converter 24-$n$ converts the reception signal 22-$n$ after the frequency reduction from an analog signal to a digital signal 25-$n$ and outputs the digital signal 25-$n$ to each of the signal processor 7 and the azimuth calculating unit 5.

The signal extracting unit 71 extracts the first demodulated signal $S_1$ using the first code $C_1$ from each of one or more digital signals 25-$n$ among the digital signals 25-1 to 25-N output from the A/D converters 24-1 to 24-N (step ST11 in FIG. 17).

The signal extracting unit 71 is only required to extract the first demodulated signal $S_1$ from each of the one or more of digital signals 25-$n$. Therefore, the signal extracting unit 71 may extract the first demodulated signal $S_1$ from any one digital signal 25-$n$ or may extract the first demodulated signal $S_1$ from each of any two digital signals 25-$n$. Alternatively, the signal extracting unit 71 may extract the first demodulated signal $S_1$ from each of the N digital signals 25-1 to 25-N.

The signal extracting unit 71 extracts the second demodulated signal $S_2$ using the second code $C_2$ from each of one or more digital signals 25-$n$ among the digital signals 25-1 to 25-N output from the A/D converters 24-1 to 24-N (step ST11 in FIG. 17).

The signal extracting unit 71 is only required to extract the second demodulated signal $S_2$ from each of the one or more of digital signals 25-$n$. Therefore, the signal extracting unit 71 may extract the second demodulated signal $S_2$ from any one digital signal 25-$n$ or may extract the second demodulated signal $S_2$ from each of any two digital signals 25-$n$. Alternatively, the signal extracting unit 71 may extract the second demodulated signal $S_2$ from each of the N digital signals 25-1 to 25-N.

The signal extracting unit 71 compensates each of the phase of the first demodulated signal $S_1$ and the phase of the second demodulated signal $S_2$ on the basis of the distance between a reception antenna 21-$n$ and the first transmission antenna 61-1, the distance between the reception antenna 21-$n$ and the second transmission antenna 61-2, and the distance in the elevation direction between the phase center of the antenna element 61-1-1 and the phase center of the antenna element 61-2-2.

The reception antenna 21-*n* refers to a reception antenna that has output a reception signal 22-*n* from which the first demodulated signal $S_1$ and the second demodulated signal $S_2$ have been extracted.

Hereinafter, the phase compensation process by the signal extracting unit 71 will be specifically described.

The phase-comparison monopulse angle measurement by the elevation calculation processing unit 73, which will be described later, uses a difference H between installation positions in the elevation direction of two antennas radiating beams and a phase difference between reception signals 22-*n* generated by elevation $\theta_{tgt}$ of a target.

Figure 18:
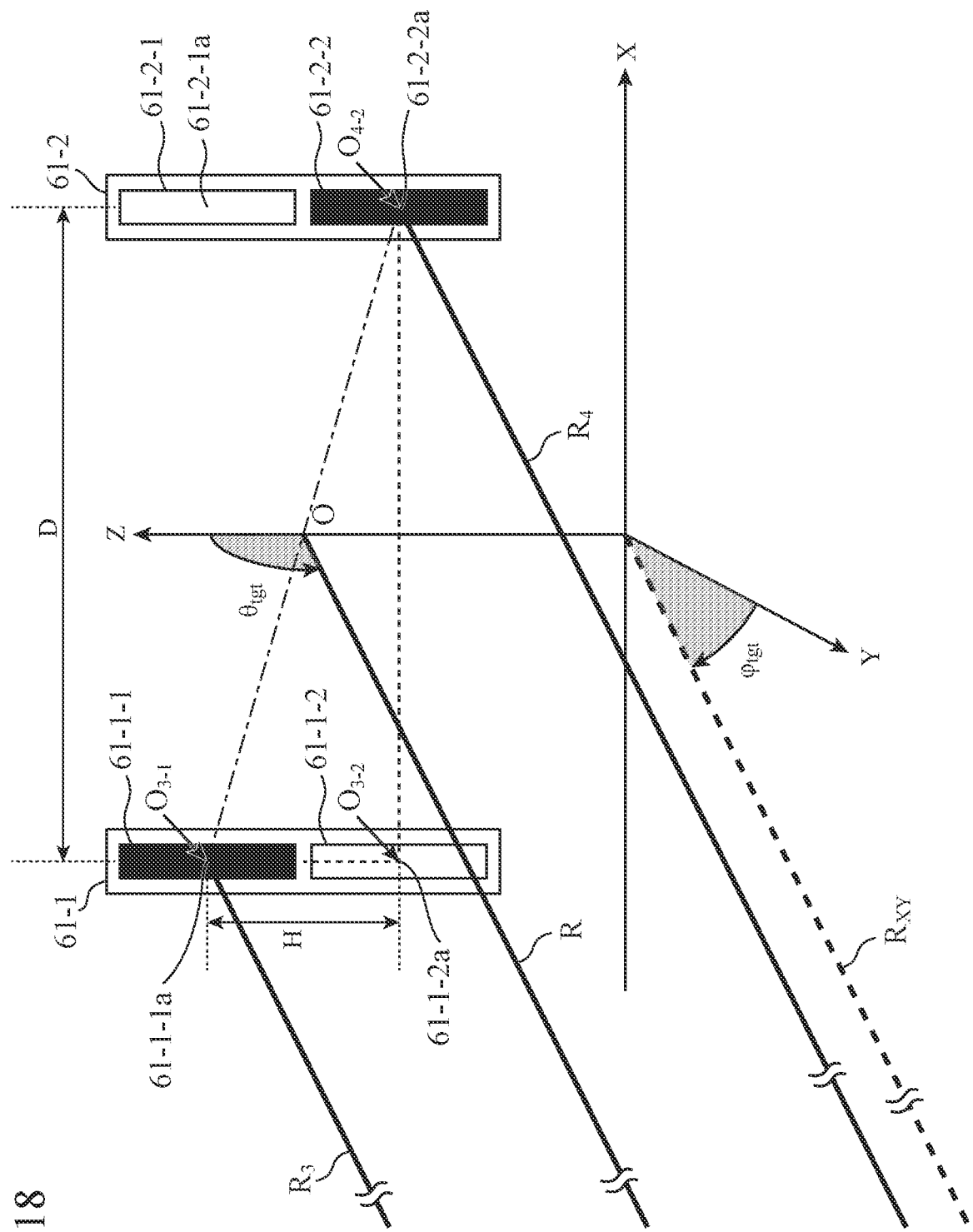
FIG. 18 is an explanatory diagram illustrating phase-comparison monopulse angle measurement by an elevation calculation processing unit 73.

As illustrated in FIG. 18, the difference H is the difference between the position in the elevation direction of a phase center $O_{3\text{-}1}$ of the antenna element 61-1-1 and the position in the elevation direction of a phase center $O_{4\text{-}2}$ of the antenna element 61-2-2. The position in the elevation direction at the phase center $O_{3\text{-}1}$ is the position in the elevation direction at the antenna aperture 61-1-1*a*. The position in the elevation direction at the phase center $O_{4\text{-}2}$ is the position in the elevation direction at the antenna aperture 61-2-2*a*.

FIG. 18 is an explanatory diagram illustrating phase-comparison monopulse angle measurement by the elevation calculation processing unit 73.

The reception signals 22-*n* have a phase difference due to the difference between the position in the azimuth direction of the phase center $O_{3\text{-}1}$ of the antenna element 61-1-1 and the position in the azimuth direction of the phase center $O_{4\text{-}2}$ of the antenna element 61-2-2. The position in the azimuth direction at the phase center $O_{3\text{-}1}$ is the position in the azimuth direction at the antenna aperture 61-1-1*a*. The position in the azimuth direction at the phase center $O_{4\text{-}2}$ is the position in the azimuth direction at the antenna aperture 61-2-2*a*.

In a case where the elevation calculation processing unit 73 performs phase-comparison monopulse angle measurement, if there is no phase difference in reception signals 22-*n* due to the difference in position in the azimuth direction and if there is the difference H in the installation positions, elevation $\theta_{tgt}$ of a target can be measured correctly.

However, in a case where there is a phase difference in the reception signals 22-*n* due to the difference in position in the azimuth direction, there are cases where elevation $\theta_{tgt}$ of a target cannot be measured correctly even when the elevation calculation processing unit 73 performs phase-comparison monopulse angle measurement.

Let us assume that the phase center O of a reception antenna 21-*n* is a phase reference point. For example, the phase center $O_{3\text{-}1}$ of the antenna element 61-1-1 is separated from the phase reference point by a distance of −D/2 in the azimuth direction and is separated from the phase reference point by +H/2 in the elevation direction. Further assumed is a case where the phase center $O_{4\text{-}2}$ of the antenna element 61-2-2 is separated from the phase reference point by a distance of +D/2 in the azimuth direction and is separated from the phase reference point by −H/2 in the elevation direction.

In this case, array response vector $v_3$ of the antenna element 61-1-1 is expressed by Equation 7 below, and array response vector $v_4$ of the antenna element 61-2-2 is expressed by Equation 8 below.

$$v_3 = \exp\left\{j\frac{2\pi}{\lambda}\left(-\frac{D}{2}\sin\theta_{tgt}\sin\phi_{tgt} + \frac{H}{2}\cos\theta_{tgt}\right)\right\} \quad (7)$$

$$v_4 = \exp\left\{j\frac{2\pi}{\lambda}\left(-\frac{D}{2}\sin\theta_{tgt}\sin\phi_{tgt} - \frac{H}{2}\cos\theta_{tgt}\right)\right\} \quad (8)$$

For example, by multiplying the first demodulated signal $S_1$ by the array response vector $v_3$ ($S_1 \times v_3$) and multiplying the second demodulated signal $S_2$ by the array response vector $v_4$ ($S_2 \times v_4$), phase compensation is performed so that the positions of the first transmission antenna 61-1 and the second transmission antenna 61-2 on the X-axis are virtually arranged at the same position.

There are cases where the calculation accuracy of elevation $\theta_{tgt}$ by the elevation calculating unit 72 is improved when the signal extracting unit 71 performs phase compensation so that the X-axis positions of the first transmission antenna 61-1 and the second transmission antenna 61-2 are virtually arranged at the same position.

The signal extracting unit 71 outputs, to the Fourier transform unit 33, one or more first demodulated signals $S_1$ that have been phase-compensated and one or more second demodulated signals $S_2$ that have been phase-compensated.

However, in a case where the distance R between the phase center O of the reception antenna 21-*n* and the target is sufficiently larger than the interval D between the first transmission antenna 61-1 and the second transmission antenna 61-2 (R>>D), far-field approximation can be applied, and thus each of the first demodulated signal $S_1$ and the second demodulated signal $S_2$ can be regarded as a plane wave. In this case, there is little influence on the angle measurement even if the signal extracting unit 71 does not perform phase compensation so that the X-axis positions of the first transmission antenna 61-1 and the second transmission antenna 61-2 are virtually arranged at the same position.

Having received one or more first demodulated signals $S_1$ from the signal extracting unit 71, the Fourier transform unit 33 performs an FFT on each of the first demodulated signals $S_1$ and thereby converts each of the first demodulated signals $S_1$ into a signal $FS_1$ in the frequency domain (step ST12 in FIG. 17).

Having received one or more second demodulated signals $S_2$ from the signal extracting unit 71, the Fourier transform unit 33 performs an FFT on each of the second demodulated signals $S_2$ and thereby converts each of the second demodulated signals $S_2$ into a signal $FS_2$ in the frequency domain (step ST12 in FIG. 17).

The Fourier transform unit 33 outputs one or more signals $FS_1$ in the frequency domain and one or more signals $FS_2$ in the frequency domain to the integration unit 34.

Having received the plurality of signals $FS_1$ in the frequency domain from the Fourier transform unit 33, the integration unit 34 incoherently integrates the plurality of signals $FS_1$ in the frequency domain (step ST13 in FIG. 17).

Having received the plurality of signals $FS_2$ in the frequency domain from the Fourier transform unit 33, the integration unit 34 incoherently integrates the plurality of signals $FS_2$ in the frequency domain (step ST13 in FIG. 17).

The integration unit 34 outputs a first integration signal $IC_1$ to the target candidate detecting unit 35 as the incoherent integration result of the signals $FS_1$ in the frequency domain and outputs a second integration signal $IC_2$ to the target candidate detecting unit 35 as the incoherent integration result of the signals $FS_2$ in the frequency domain.

If the number of signals $FS_1$ in the frequency domain output from the Fourier transform unit 33 is one, the integration unit 34 outputs the signals FS$_1$ in the frequency domain as the first integration signal IC$_1$ to the target candidate detecting unit 35.

Likewise, if the number of signals FS$_2$ in the frequency domain output from the Fourier transform unit 33 is one, the integration unit 34 outputs the signals FS$_2$ in the frequency domain as the second integration signal IC$_2$ to the target candidate detecting unit 35.

Having received the first integration signal IC$_1$ from the integration unit 34, the target candidate detecting unit 35 calculates the first target signal M$_1$(θ$_{tgt}$) indicating the amplitude of the target candidate, for example, by performing CFAR processing using the first integration signal IC$_1$ (step ST14 in FIG. 17).

Having received the second integration signal IC$_2$ from the integration unit 34, the target candidate detecting unit 35 calculates the second target signal M$_2$(θ$_{tgt}$) indicating the amplitude of the target candidate, for example, by performing CFAR processing using the second integration signal IC$_2$ (step ST14 in FIG. 17).

The target candidate detecting unit 35 outputs each of the first target signal M$_1$(θ$_{tgt}$) and the second target signal M$_2$(θ$_{tgt}$) to the elevation calculation processing unit 73.

Having received the first target signal M$_1$(θ$_{tgt}$) and the second target signal M$_2$(θ$_{tgt}$) from the target candidate detecting unit 35, the elevation calculation processing unit 73 calculates the sum signal Σ(θ$_{tgt}$) of the first target signal M$_1$(θ$_{tgt}$) and the second target signal M$_2$(θ$_{tgt}$) as expressed in Equation 9 below (step ST15 in FIG. 17).

$$\Sigma(\theta_{tgt}) = M_1(\theta_{tgt}) + M_2(\theta_{tgt}) \qquad (9)$$
$$= M_{tgt}A(1+\exp(-j\gamma_{tgt}))$$
$$= 2M_{tgt}\exp\left(-j\frac{\gamma_{tgt}}{2}\right)\cos\left(\frac{\gamma_{tgt}}{2}\right)$$

In Equation 9, M$_{tgt}$ denotes the amplitude of the target signal.

The elevation calculation processing unit 73 also calculates the difference signal Δ(θ$_{tgt}$) between the first target signal M$_1$(θ$_{tgt}$) and the second target signal M$_2$(θ$_{tgt}$) as expressed in Equation 10 below (step ST16 in FIG. 17).

$$\Delta(\theta_{tgt}) = M_1(\theta_{tgt}) + M_2(\theta_{tgt}) \qquad (10)$$
$$= M_{tgt}A(1+\exp(-j\gamma_{tgt}))$$
$$= 2M_{tgt}\exp\left(-j\frac{\gamma_{tgt}}{2}\right)\sin\left(\frac{\gamma_{tgt}}{2}\right)$$

The sum signal Σ(θ$_{tgt}$) and the difference signal Δ(θ$_{tgt}$) have the same amplitude M$_{tgt}$ and different phase differences γ$_{tgt}$.

Angle error ρ of elevation θ$_{tgt}$ based on phase difference γ$_{tgt}$ of a reception signal 22-$n$ is expressed by Equation 11 below.

$$\rho = -\frac{j\Delta(\theta_{tgt})}{\Sigma(\theta_{tgt})} = \frac{2M_{tgt}\exp\left(-j\frac{\gamma_{tgt}}{2}\right)\sin\left(\frac{\gamma_{tgt}}{2}\right)}{2M_{tgt}\exp\left(-j\frac{\gamma_{tgt}}{2}\right)\cos\left(\frac{\gamma_{tgt}}{2}\right)} = \tan\left(\frac{\gamma_{tgt}}{2}\right) \qquad (11)$$

Meanwhile, since the phase center O$_1$ of the antenna element 61-1-1 and the phase center O$_2$ of the antenna element 61-2-2 are separated by distance H in the elevation direction, the phase difference γ$_{tgt}$ of a reception signal 22-$n$ is expressed by the distance H and the elevation θ$_{tgt}$ of a target as expressed in Equation 12 below.

$$\gamma_{tgt} = \frac{2\pi}{\lambda}H\sin\theta_{tgt} \qquad (12)$$

From Equations 11 and 12, the elevation θ$_{tgt}$ of the target is expressed as Equation 13 below.

$$\theta_{tgt} = \sin^{-1}\left(-\tan^{-1}\left(-\frac{j\Delta(\theta_{tgt})}{\Sigma(\theta_{tgt})}\right)\frac{\lambda}{\pi H}\right) \qquad (13)$$

The elevation calculation processing unit 73 calculates the elevation θ$_{tgt}$ of the target by substituting the sum signal Σ(θ$_{tgt}$) and the difference signal Δ(θ$_{tgt}$) that have been calculated into Equation 13 as phase-comparison monopulse angle measurement (step ST17 in FIG. 17).

The elevation calculation processing unit 73 outputs elevation θ$_{tgt}$ of the target that has been calculated to the display 6.

Having received the digital signals 25-1 to 25-N from the A/D converters 24-1 to 24-N, the azimuth calculating unit 5 calculates azimuth φ$_{tgt}$ of the target by performing DBF processing using the digital signals 25-1 to 25-N as in the first embodiment (step ST18 in FIG. 17).

The azimuth calculating unit 5 outputs azimuth φ$_{tgt}$ of the target that has been calculated to the display 6.

Here, the azimuth calculating unit 5 calculates azimuth φ$_{tgt}$ of the target by performing DBF processing. However, this is merely an example, and the azimuth calculating unit 5 may calculate azimuth φ$_{tgt}$ of the target by performing MIMO processing using the digital signals 25-1 to 25-N.

It is possible to suppress occurrence of grating lobes in a case where the azimuth calculating unit 5 performs DBF processing or MIMO processing.

In the angle measuring device 1 illustrated in FIG. 12, the azimuth calculating unit 5 acquires the digital signals 25-1 to 25-N output from the A/D converters 24-1 to 24-N. However, this is merely an example, and the azimuth calculating unit 5 may acquire the first demodulated signal S$_1$ or the second demodulated signal S$_2$ phase-compensated by the signal extracting unit 71. In a case where the azimuth calculating unit 5 acquires the first demodulated signal S$_1$ or the second demodulated signal S$_2$, the signal extracting unit 71 extracts the first demodulated signal S$_1$ or the second demodulated signal S$_2$ from each of two or more digital signals 25-$n$ out of the digital signals 25-1 to 25-N and compensates the phase of the first demodulated signal S$_1$ or the phase of the second demodulated signal S$_2$. In order to calculate the azimuth φ$_{tgt}$ of the target with a high resolution, it is desirable that the signal extracting unit 71 extracts N first demodulated signals S$_1$ or N second demodulated signals S$_2$ from all of the digital signals 25-1 to 25-N and compensates the phases of the N first demodulated signals S$_1$ or the N second demodulated signals S$_2$.

The azimuth calculating unit 5 calculates the azimuth φ$_{tgt}$ of the target by performing DBF processing or MIMO processing using the N first demodulated signals S$_1$ or the N second demodulated signals S$_2$ phase-compensated by the signal extracting unit 31.

The display 6 displays, for example, elevation θ$_{tgt}$ of the target output from the elevation calculating unit 72 and azimuth φ$_{tgt}$ of the target output from the azimuth calculating unit 5.

From the above, also in the angle measuring device 1 including the first transmission antenna 61-1 having the two antenna apertures 61-1-1a and 61-1-2a in the elevation direction and the second transmission antenna 61-2 having the two antenna apertures 61-2-1a and 61-2-2a in the elevation direction, it is possible to calculate the azimuth of a target with a higher resolution than in a case of using a single reception antenna while calculating the elevation of the target as in the angle measuring device 1 of the first embodiment.

In the angle measuring device 1 illustrated in FIG. 12, the first transmission antenna 61-1 has two antenna apertures 61-1-1a and 61-1-2a, and the second transmission antenna 61-2 has two antenna apertures 61-2-1a and 61-2-2a. However, this is merely an example, as illustrated in FIG. 19, the first transmission antenna 61-1 may have two antenna apertures 61-1-1a and 61-1-2a, and the second transmission antenna 61-2 may have only one antenna aperture 61-2-2a.

Figure 19:
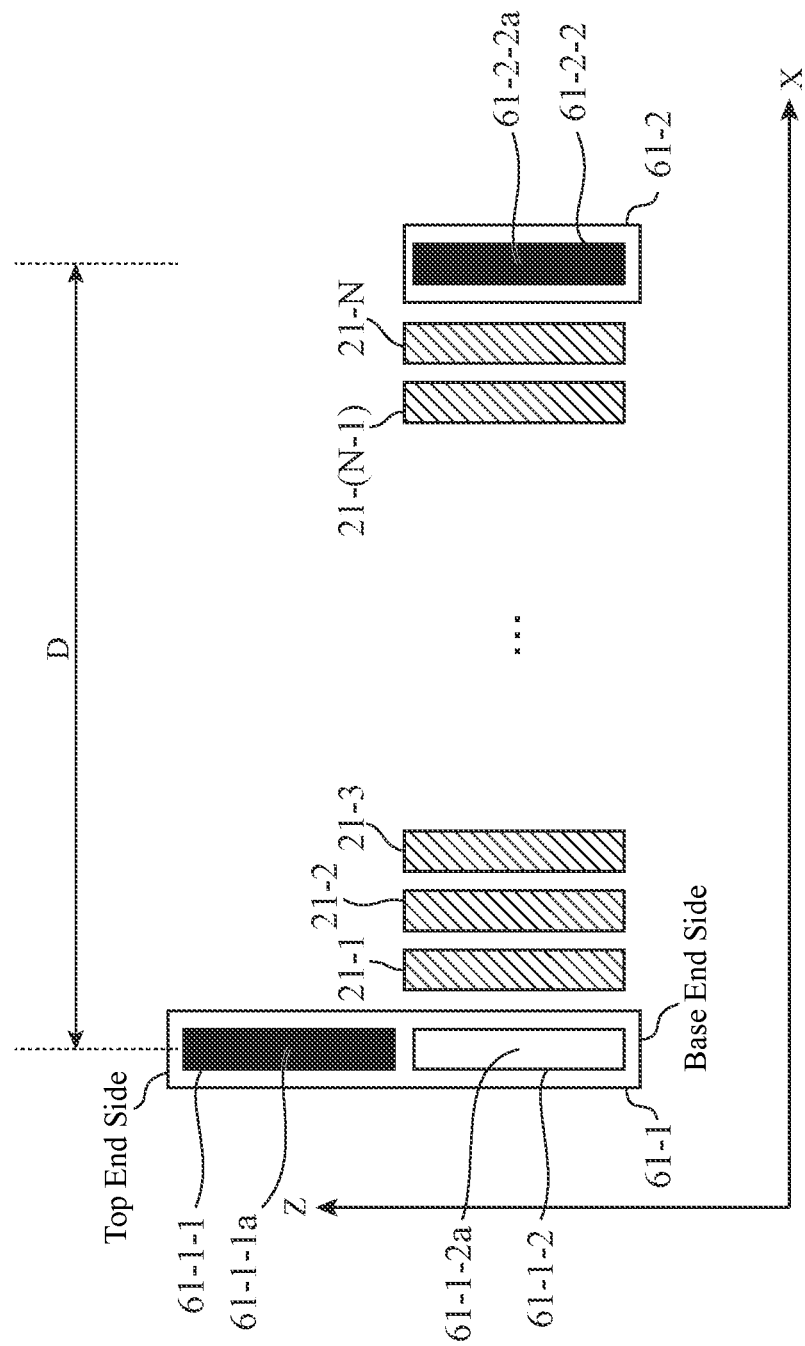
FIG. 19 is an explanatory diagram illustrating an arrangement example of a first transmission antenna 61-1, a second transmission antenna 61-2, and reception antennas 21-1 to 21-N.

FIG. 19 is an explanatory diagram illustrating an arrangement example of the first transmission antenna 61-1, the second transmission antenna 61-2, and the reception antennas 21-1 to 21-N.

The second transmission antenna 61-2 has one antenna element 61-2-2 and one antenna aperture 61-2-2a.

In the example of FIG. 19, the first transmission antenna 61-1 radiates the third beam 62-3 from the antenna aperture 61-1-1a among the two antenna apertures 61-1-1a and 61-1-2a, and the second transmission antenna 61-2 radiates the fourth beam 62-4 from the antenna aperture 61-2-2a.

The antenna aperture 61-2-2a of the second transmission antenna 61-2 is separated from the antenna aperture 61-1-1a by distance H in the elevation direction.

The length of the second transmission antenna 61-2 is half the length of the first transmission antenna 61-1.

The installation position of the first transmission antenna 61-1 in the azimuth direction and the installation position of the second transmission antenna 61-2 in the azimuth direction are different as illustrated in FIG. 19.

In the example of FIG. 19, the arrangement interval between the first transmission antenna 61-1 and the second transmission antenna 61-2 is D.

Elevation angle $\theta_{B3}$ in the radiation direction of the third beam 62-3 and elevation angle $\theta_{B4}$ in the radiation direction of the fourth beam 62-4 are the same angle. $\theta_{B3}=\theta_{B4}$.

Also in the angle measuring device 1 including the second transmission antenna 61-2 having only one antenna aperture 61-2-2a, it is possible to calculate the azimuth of a target with a higher resolution than in a case of using a single reception antenna while calculating the elevation of the target.

Fifth Embodiment

In the angle measuring device 1 illustrated in FIG. 12, the beam transmitting unit 2 radiates the third beam 62-3 and the fourth beam 62-4 simultaneously.

In a fifth embodiment, description will be given on an angle measuring device 1 in which the beam transmitting unit 2 radiates the third beam 62-3 and the fourth beam 62-4 in a time-division manner.

In the angle measuring device 1 of the fifth embodiment, for convenience of explanation, it is assumed that the beam transmitting unit 2 radiates the third beam 62-3 and then radiates the fourth beam 62-4.

The configuration of the angle measuring device 1 of the fifth embodiment is illustrated in FIG. 12 as in the fourth embodiment. Note that, in a case where the beam transmitting unit 2 radiates the third beam 62-3 and the fourth beam 62-4 in a time-division manner, each of the first demodulated signal $S_1$ and the second demodulated signal $S_2$ can be extracted without adding each of the first code $C_1$ and the second code $C_2$ to the local oscillation signal. Therefore, the angle measuring device 1 may not include the code modulation unit 12; however, the first code $C_1$ and the second code $C_2$ may be each added to the local oscillation signal, and thus the angle measuring device 1 may include the code modulation unit 12.

First, the first transmission antenna 61-1 radiates the third beam 62-3 into space as in the fourth embodiment.

The third beam 62-3 radiated from the first transmission antenna 61-1 is reflected by the target, and the third beam 62-3 reflected by the target is received by each of the reception antennas 21-1 to 21-N as a third reflection wave 70-3.

Having received the third reflection wave 70-3, a reception antenna 21-n (n=1, . . . , N) outputs a reception signal 22-n including the third reflection wave 70-3 to a receiver 23-n.

The receiver 23-n reduces the frequency of the reception signal 22-n output from the reception antenna 21-n, for example, from an RF to an IF using the local oscillation signal output from the local oscillation signal generating unit 11.

The receiver 23-n outputs the reception signal 22-n after the frequency reduction to an A/D converter 24-n.

Having received the reception signal 22-n after the frequency reduction from the receiver 23-n, the A/D converter 24-n converts the reception signal 22-n after the frequency reduction from an analog signal to a digital signal 25-n and outputs the digital signal 25-n to each of the signal processor 7 and the azimuth calculating unit 5.

The signal extracting unit 71 outputs each of one or more digital signals 25-n among the digital signals 25-1 to 25-N output from the A/D converters 24-1 to 24-N to the elevation calculating unit 72 as the first demodulated signal $S_1$.

Having received the digital signals 25-1 to 25-N from the A/D converters 24-1 to 24-N, the azimuth calculating unit 5 calculates azimuth $\varphi_{tgt}$ of the target by performing DBF processing or MIMO processing using the digital signals 25-1 to 25-N as in the first embodiment.

The second transmission antenna 61-2 then radiates the fourth beam 62-4 into space.

The fourth beam 62-4 radiated from the second transmission antenna 61-2 is reflected by the target, and the fourth beam 62-4 reflected by the target is received by each of the reception antennas 21-1 to 21-N as a fourth reflection wave 70-4.

Having received the fourth reflection wave 70-4, a reception antenna 21-n outputs a reception signal 22-n including the fourth reflection wave 70-4 to a receiver 23-n.

The receiver 23-n reduces the frequency of the reception signal 22-n output from the reception antenna 21-n, for example, from an RF to an IF using the local oscillation signal output from the local oscillation signal generating unit 11.

The receiver 23-n outputs the reception signal 22-n after the frequency reduction to an A/D converter 24-n.

Having received the reception signal 22-n after the frequency reduction from the receiver 23-n, the A/D converter 24-n converts the reception signal 22-n after the frequency reduction from an analog signal to a digital signal 25-n and outputs the digital signal 25-n to each of the signal processor 7 and the azimuth calculating unit 5.

The signal extracting unit 71 outputs each of one or more digital signals 25-$n$ among the digital signals 25-1 to 25-N output from the A/D converters 24-1 to 24-N to the elevation calculating unit 72 as the second demodulated signal $S_2$.

Having received the digital signals 25-1 to 25-N from the A/D converters 24-1 to 24-N, the azimuth calculating unit 5 calculates azimuth $\varphi_{tgt}$ of the target by performing DBF processing or MIMO processing using the digital signals 25-1 to 25-N as in the first embodiment.

The contents of processing by the elevation calculating unit 72 are similar to those of the fourth embodiment, and thus detailed description thereof is omitted.

Also in the angle measuring device 1 which includes the beam transmitting unit 2 for radiating the third beam 62-3 and the fourth beam 62-4 in a time-division manner, it is possible to calculate the azimuth of a target with a higher resolution than in a case of using a single reception antenna while calculating the elevation of the target as in the angle measuring device 1 of the fourth embodiment.

In a case where the angle measuring device 1 does not include the code modulation unit 12, the processing load is reduced as compared with the angle measuring device 1 of the fourth embodiment.

Sixth Embodiment

In the angle measuring device 1 illustrated in FIG. 12, the frequency of the third beam 62-3 radiated from the first transmission antenna 61-1 and the frequency of the fourth beam 62-4 radiated from the second transmission antenna 61-2 are almost the same.

In a sixth embodiment, description will be given on the angle measuring device 1 in which the frequency of the third beam 62-3 radiated from the first transmission antenna 61-1 and the frequency of the fourth beam 62-4 radiated from the second transmission antenna 61-2 are different.

It is assumed that the frequency of the third beam 62-3 is a first frequency and that the frequency of the fourth beam 62-4 is a second frequency.

The configuration of the angle measuring device 1 of the sixth embodiment is illustrated in FIG. 12 as in the fourth embodiment. However, in a case where the frequency of the third beam 62-3 radiated from the first transmission antenna 61-1 and the frequency of the fourth beam 62-4 radiated from the second transmission antenna 61-2 are different, it is possible to extract each of the first demodulated signal $S_1$ and the second demodulated signal $S_2$ without adding each of the first code $C_1$ and the second code $C_2$ to the local oscillation signal. Therefore, the angle measuring device 1 may not include the code modulation unit 12; however, the first code $C_1$ and the second code $C_2$ may be each added to the local oscillation signal, and thus the angle measuring device 1 may include the code modulation unit 12.

The beam receiving unit 3 operates in a similar manner to that in the fourth embodiment.

The signal extracting unit 71 converts each of digital signals 25-$n$ into a signal in the frequency domain by performing, for example, an FFT on each of one or more digital signals 25-$n$ among the digital signals 25-1 to 25-N output from the A/D converters 24-1 to 24-N.

The signal extracting unit 71 extracts a signal of the first frequency from each of the signals in the frequency domain and extracts a signal of the second frequency from each of the signals in the frequency domain.

The signal extracting unit 71 converts each of the signals of the first frequency into a signal in the time domain by, for example, performing an inverse FFT on each of the signals in the first frequency that have been extracted and outputs each of the signals in the time domain to the elevation calculating unit 72 as the first demodulated signal $S_1$.

The signal extracting unit 71 also converts each of the signals of the second frequency into a signal in the time domain by, for example, performing an inverse FFT on each of the signals in the second frequency that have been extracted and outputs each of the signals in the time domain to the elevation calculating unit 72 as the second demodulated signal $S_2$.

Having received the digital signals 25-1 to 25-N from the A/D converters 24-1 to 24-N, the azimuth calculating unit 5 calculates azimuth $\varphi_{tgt}$ of a target by performing DBF processing using the digital signals 25-1 to 25-N as in the fourth embodiment.

The azimuth calculating unit 5 may extract N first demodulated signals $S_1$ or N second demodulated signals $S_2$ from all of the digital signals 25-1 to 25-N, for example, in a similar manner to that of the signal extracting unit 71 using the digital signals 25-1 to 25-N before performing DBF processing or the like.

In a case where N first demodulated signals $S_1$ or N second demodulated signals $S_2$ are extracted, the azimuth calculating unit 5 performs DBF processing or MIMO processing using the N first demodulated signals $S_1$ or the N second demodulated signals $S_2$.

Also in the angle measuring device 1 in which the frequency of the third beam 62-3 radiated from the first transmission antenna 61-1 and the frequency of the fourth beam 62-4 radiated from the second transmission antenna 61-2 are different, it is possible to calculate the azimuth of a target with a higher resolution than in a case of using a single reception antenna while calculating the elevation of the target as in the angle measuring device 1 of the fourth embodiment.

In a case where the angle measuring device 1 does not include the code modulation unit 12, the processing load is reduced as compared with the angle measuring device 1 of the fourth embodiment.

Figure 20:
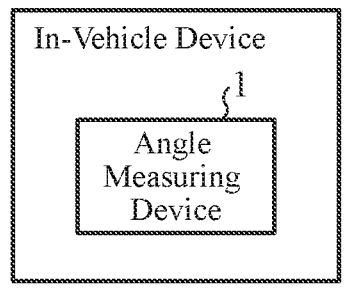
FIG. 20 is a configuration diagram illustrating an in-vehicle device including an angle measuring device 1 according to any one of the first to sixth embodiments.

The angle measuring device 1 according to any one of the first to sixth embodiments is included in an in-vehicle device mounted on a vehicle, for example, as illustrated in FIG. 20.

FIG. 20 is a configuration diagram illustrating an in-vehicle device including the angle measuring device 1 according to any one of the first to sixth embodiments.

The in-vehicle device including the angle measuring device 1 according to any of the embodiments targets another vehicle, a pedestrian, a guardrail, a utility pole, or the like using the angle measuring device 1 and calculates each of elevation $\theta_{tgt}$ of the target and azimuth $\varphi_{tgt}$ of the target.

Note that the present invention may include a flexible combination of the embodiments, a modification of any component of the embodiments, or an omission of any component in the embodiments within the scope of the present invention.

INDUSTRIAL APPLICABILITY

The present invention is suitable for an angle measuring device, an angle measuring method, and an in-vehicle device for calculating each of the elevation of a target and the azimuth of the target.

REFERENCE SIGNS LIST

1: angle measuring device, 2: beam transmitting unit, 3: beam receiving unit, 4, 7: signal processor, 5: azimuth calculating unit, 6: display, 11: local oscillation signal generating unit, 12: code modulation unit, 13: transmission switching unit, 14-1, 14-2: transmitter, 15-1: first transmission antenna, 15-1a: antenna aperture, 15-2: second transmission antenna, 15-2a: antenna aperture, 16-1: first beam, 16-2: second beam, 20-1: first reflection wave, 20-2: second reflection wave, 21-1 to 21-N: reception antenna, 22-1 to 22-N: reception signal, 23-1 to 23-N: receiver, 24-1 to 24-N: A/D converter, 25-1 to 25-N: digital signal, 31: signal extracting unit, 32: elevation calculating unit, 33: Fourier transform unit, 34: integration unit, 35: target candidate detecting unit, 36: elevation calculation processing unit, 41: signal extracting circuit, 42: Fourier transform circuit, 43: integration circuit, 44: target candidate detecting circuit, 45: elevation calculation processing circuit, 46: azimuth calculating circuit, 51: memory, 52: processor, 61-1: first transmission antenna, 61-1-1, 61-1-2: antenna element, 61-1-1a, 61-1-2a: antenna aperture, 61-2: second transmission antenna, 61-2-1, 61-2-2: antenna element, 61-2-1a, 61-2-2a: antenna aperture, 62-3: third beam, 62-4: fourth beam, 70-3: third reflection wave, 70-4: fourth reflection wave, 71: signal extracting unit, 72: elevation calculating unit, 73: elevation calculation processing unit.

The invention claimed is:

1. An angle measuring device comprising:
processing circuitry performing a process of:
when a first beam is radiated from a first transmission antenna and a second beam is radiated from a second transmission antenna, the second beam having an elevation angle in a radiation direction of which is different from an elevation angle in a radiation direction of the first beam,
    extracting a first signal that includes a first reflection wave and does not include a second reflection wave as a first demodulated signal and a second signal that includes the second reflection wave and does not include the first reflection wave as a second demodulated signal from reception signals output from one or more reception antennas among a plurality of reception antennas, wherein
        each of the plurality of reception antennas is arranged between the first transmission antenna and the second transmission antenna, and
        each of the plurality of reception antennas outputs a reception signal including the first reflection wave, which is the first beam reflected by a target, and the second reflection wave, which is the second beam reflected by the target;
calculating an elevation of the target by performing monopulse angle measurement using a sum signal of the first demodulated signal and the second demodulated signal and a difference signal between the first demodulated signal and the second demodulated signal; and
calculating an azimuth of the target using reception signals output from the plurality of reception antennas, wherein
an installation position of the second transmission antenna in an azimuth direction is different from an installation position of the first transmission antenna in the azimuth direction.

2. The angle measuring device according to claim 1, further comprising:
    the first transmission antenna for radiating the first beam;
    the second transmission antenna for radiating the second beam, an installation position of the second transmission antenna in the azimuth direction being different from an installation position in the azimuth direction of the first transmission antenna; and
    the plurality of reception antennas for receiving each of the first reflection wave and the second reflection wave and outputting a reception signal including the first reflection wave and the second reflection wave to the signal extracting unit, the plurality of reception antennas arranged between the first transmission antenna and the second transmission antenna.

3. The angle measuring device according to claim 1, wherein the first transmission antenna radiates the first beam to which a first code is assigned, the second transmission antenna radiates the second beam to which a second code that is different from the first code is assigned, and
the process extracts, using the first code, the first demodulated signal from the reception signal output from the one or more reception antennas and extracts, using the second code, the second demodulated signal from the reception signal output from the one or more reception antennas.

4. The angle measuring device according to claim 1, wherein the first beam and the second beam are radiated in a time-division manner, and
the process outputs a reception signal output from the one or more reception antennas as the first demodulated signal when the first transmission antenna radiates the first beam and outputs a reception signal output from the one or more reception antennas as the second demodulated signal when the second transmission antenna radiates the second beam.

5. The angle measuring device according to claim 1, wherein a frequency of the first beam radiated from the first transmission antenna is a first frequency, a frequency of the second beam radiated from the second transmission antenna is a second frequency that is different from the first frequency, and
the process extracts the first signal of the first frequency as the first demodulated signal and extracts the second signal of the second frequency as the second demodulated signal from the reception signal output from the one or more reception antennas.

6. The angle measuring device according to claim 1, wherein the process compensates each of a phase of the first demodulated signal and a phase of the second demodulated signal on a basis of a distance in the azimuth direction between a reception antenna, having output the reception signals from which the first and second demodulated signals have been extracted, and the first transmission antenna and a distance in the azimuth direction between the reception antenna having output the reception signals from which the first and second demodulated signals have been extracted and the second transmission antenna and outputs each of the first demodulated signal that has been phase-compensated and the second demodulated signal that has been phase-compensated.

7. The angle measuring device according to claim 1, further comprising:
    the first transmission antenna having two antenna apertures in the elevation direction;

the second transmission antenna having two antenna apertures in the elevation direction, the installation position of the second transmission antenna in the azimuth direction being different from the installation position in the azimuth direction of the first transmission antenna; and the plurality of reception antennas arranged between the first transmission antenna and the second transmission antenna, wherein, of the two antenna apertures of the first transmission antenna, an antenna aperture on a top end side is a first antenna aperture, and an antenna aperture on a base end side is a second antenna aperture, of the two antenna apertures of the second transmission antenna, an antenna aperture on a top end side is a third antenna aperture, and an antenna aperture on a base end side is a fourth antenna aperture, a position in the elevation direction of the first antenna aperture is different from a position in the elevation direction of the fourth antenna aperture, a position in the elevation direction of the second antenna aperture is different from a position in the elevation direction of the third antenna aperture, instead of the first beam radiated from the first transmission antenna and the second beam radiated from the second transmission antenna, a third beam is radiated from the first antenna aperture, and a fourth beam having a same elevation angle in a radiation direction as an elevation angle of the third beam is radiated from the fourth antenna aperture, or a fifth beam is radiated from the second antenna aperture, and a sixth beam having a same elevation angle in a radiation direction as an elevation angle of the fifth beam is radiated from the third antenna aperture, and when a reception signal including a third reflection wave which is the third beam reflected by the target and a fourth reflection wave which is the fourth beam reflected by the target is output from each of the plurality of reception antennas, or when a reception signal including a fifth reflection wave which is the fifth beam reflected by the target and a sixth reflection wave which is the sixth beam reflected by the target is output from each of the plurality of reception antennas, the process extracts, as the first demodulated signal, a signal including the third reflection wave and not including the fourth reflection wave or extracts, as the second demodulated signal, a signal including the fourth reflection wave and not including the third reflection wave from the reception signal output from the one or more reception antennas among the plurality of reception antennas or extracts, as the first demodulated signal, a signal including the fifth reflection wave and not including the sixth reflection wave or extracts, as the second demodulated signal, a signal including the sixth reflection wave and not including the fifth reflection wave from the reception signal output from the one or more reception antennas.

8. The angle measuring device according to claim 7, wherein the process compensates each of a phase of the first demodulated signal and a phase of the second demodulated signal on a basis of a distance in the azimuth direction between a reception antenna having output the reception signals from which the first and second demodulated signals have been extracted and the first transmission antenna, a distance in the azimuth direction between the reception antenna having output the reception signals from which the first and second demodulated signals have been extracted and the second transmission antenna, and a distance in the elevation direction between the first antenna aperture and the fourth antenna aperture or a distance in the elevation direction between the second antenna aperture and the third antenna aperture and outputs each of the first demodulated signal that has been phase-compensated and the second demodulated signal that has been phase-compensated.

9. The angle measuring device according to claim 1, further comprising:

the first transmission antenna having two antenna apertures in the elevation direction;

the second transmission antenna whose length is half a length of the first transmission antenna, the installation position of the second transmission antenna in the azimuth direction being different from the installation position in the azimuth direction of the first transmission antenna; and the plurality of reception antennas arranged between the first transmission antenna and the second transmission antenna, wherein, of the two antenna apertures of the first transmission antenna, an antenna aperture on a top end side is a first antenna aperture, and an antenna aperture on a base end side is a second antenna aperture, a position in the elevation direction of the first antenna aperture or a position in the elevation direction of the second antenna aperture is different from a position in the elevation direction of the second transmission antenna, instead of the first beam radiated from the first transmission antenna and the second beam radiated from the second transmission antenna, a third beam is radiated from the first antenna aperture, and a fourth beam having a same elevation angle in a radiation direction as an elevation angle of the third beam is radiated from the second transmission antenna if the position in the elevation direction of the first antenna aperture is different from the position in the elevation direction of the second transmission antenna, and a fifth beam is radiated from the second antenna aperture, and a sixth beam having a same elevation angle in a radiation direction as an elevation angle of the fifth beam is radiated from the second transmission antenna if the position in the elevation direction of the second antenna aperture is different from the position in the elevation direction of the second transmission antenna, and when a reception signal including a third reflection wave which is the third beam reflected by the target and a fourth reflection wave which is the fourth beam reflected by the target is output from each of the plurality of reception antennas, or when a reception signal including a fifth reflection wave which is the fifth beam reflected by the target and a sixth reflection wave which is the sixth beam reflected by the target is output from each of the plurality of reception antennas, the process extracts, as the first demodulated signal, a signal including the third reflection wave and not including the fourth reflection wave or extracts, as the second demodulated signal, a signal including the fourth reflection wave and not including the third reflection wave from the reception signal output from the one or more reception antennas among the plurality of reception antennas, or extracts, as the first demodulated signal, a signal including the fifth reflection wave and not including the sixth reflection wave or extracts, as the second demodulated signal, a signal including the sixth reflection wave and not including the fifth reflection wave from the reception signal output from the one or more reception antennas.

10. The angle measuring device according to claim 1, wherein the process calculates the azimuth of the target by performing digital beam forming (DBF) processing or multi-input multi-output (MIMO) processing using reception signals output from the plurality of reception antennas.

11. An angle measuring method comprising:
   radiating a first beam from a first transmission antenna and a second beam from a second transmission antenna, the second beam having an elevation angle in a radiation direction of which is different from an elevation angle in a radiation direction of the first beam;
   extracting a first signal that includes a first reflection wave and does not include a second reflection wave as a first demodulated signal and a second signal that includes the second reflection wave and does not include the first reflection wave as a second demodulated signal from reception signals output from one or more reception antennas among a plurality of reception antennas, wherein
      each of the plurality of reception antennas is arranged between the first transmission antenna and the second transmission antenna, and
      each of the plurality of reception antennas outputs a reception signal including the first reflection wave, which is the first beam reflected by a target, and the second reflection wave, which is the second beam reflected by the target;
   calculating an elevation of the target by performing monopulse angle measurement using a sum signal of the first demodulated signal and the second demodulated signal and a difference signal between the first demodulated signal and the second demodulated signal; and
   calculating an azimuth of the target using reception signals output from the plurality of reception antennas, wherein
   an installation position of the second transmission antenna in an azimuth direction is different from an installation position of the first transmission antenna in the azimuth direction.

12. An in-vehicle device comprising an angle measuring device for calculating each of an elevation of a target and an azimuth of the target, the in-vehicle device mounted on a vehicle,
   wherein the angle measuring device comprises:
   processing circuitry performing a process of:
   when a first beam is radiated from a first transmission antenna and a second beam is radiated from a second transmission antenna, the second beam having an elevation angle in a radiation direction of which is different from an elevation angle in a radiation direction of the first beam,
      extracting a first signal that includes a first reflection wave and does not include a second reflection wave as a first demodulated signal and a second signal that includes the second reflection wave and does not include the first reflection wave as a second demodulated signal from reception signals output from one or more reception antennas among a plurality of reception antennas, wherein
         each of the plurality of reception antennas is arranged between the first transmission antenna and the second transmission antenna, and
         each of the plurality of reception antennas outputs a reception signal including the first reflection wave, which is the first beam reflected by a target, and the second reflection wave, which is the second beam reflected by the target;
   calculating an elevation of the target by performing monopulse angle measurement using a sum signal of the first demodulated signal and the second demodulated signal and a difference signal between the first demodulated signal and the second demodulated signal; and
   calculating an azimuth of the target using reception signals output from the plurality of reception antennas, wherein
   an installation position of the second transmission antenna in an azimuth direction is different from an installation position of the first transmission antenna in the azimuth direction.

* * * * *